United States Patent [19]

Arimoto

[11] Patent Number: 5,673,115
[45] Date of Patent: Sep. 30, 1997

[54] IMAGE RECORDING METHOD AND DEVICE WITH MEMORY PRINTING OF PLURAL RECORDING MEDIA ON A RECORDING DRUM

[75] Inventor: Shinobu Arimoto, Yokohama, Japan

[73] Assignee: Canon Kabushiki Kaisha, Tokyo, Japan

[21] Appl. No.: 645,036

[22] Filed: May 13, 1996

Related U.S. Application Data

[63] Continuation of Ser. No. 231,685, Apr. 25, 1994, abandoned.

[30] Foreign Application Priority Data

May 6, 1993 [JP] Japan .................................. 5-105529

[51] Int. Cl.$^6$ .............................. H04N 1/23; G03G 15/01
[52] U.S. Cl. ...................... 358/296; 358/300; 358/500; 399/361
[58] Field of Search .......................... 358/296, 409; 355/218, 235; 347/229, 234, 248, 250, 232, 139, 115, 399

[56] References Cited

U.S. PATENT DOCUMENTS

| | | | |
|---|---|---|---|
| 4,605,957 | 8/1986 | Yamada | 358/78 |
| 4,695,895 | 9/1987 | Nagashima | 358/280 |
| 4,731,672 | 3/1988 | Sugishima et al. | 358/296 |
| 5,086,318 | 2/1992 | Takeda et al. | 355/271 |
| 5,164,783 | 11/1992 | Taguchi et al. | 355/327 |
| 5,335,056 | 8/1994 | Muramatsu | 355/327 |
| 5,383,012 | 1/1995 | Yamada | 355/326 |
| 5,481,365 | 1/1996 | Arimoto | 358/296 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

In an image recording apparatus in which two sheets of recording paper are retained on a transfer drum, reading of the image of an original by a reading optical system is started at the leading edge of a signal L-ITOPA obtained as a result of synchronizing a signal D-ITOPA, which is obtained by applying a time delay T to a signal ITOPA representing the retention position of the first sheet of recording paper, to a line synchronizing signal BD produced as a count signal by an address counter for the sub-scan direction. The image is stored in a page memory and recorded on the first sheet of recording paper. Then, at the leading edge of a signal ITOP obtained by applying the time delay T to a signal ITOPB representing the retention position of the second sheet of recording paper, read-out of the stored image from the page memory is started and the image is recorded on the second sheet of recording paper. As a result, once images separated by color have been written in memory, a displacement in the recording position of each separate color image is no more than the equivalent of one line even when the images are read out of the memory and recorded on recording paper.

77 Claims, 23 Drawing Sheets

IMAGE RECORDING METHOD AND DEVICE WITH MEMORY PRINTING OF PLURAL RECORDING MEDIA ON A RECORDING DRUM

This application is a continuation of application Ser. No. 08/231,685, filed Apr. 25, 1994, now abandoned.

BACKGROUND OF THE INVENTION

1. Field of the Invention:

This invention relates to an image recording method and apparatus and, more particularly, to an image recording method and apparatus for recording an image by successively superimposing images separated by color.

2. Description of the Related Art:

A color copier is provided with an image transfer body such as a transfer drum and uses a multiple-image recording method to form a color image by successively superimposing images, which have been separated into the four colors of magenta, cyan, yellow and black, on recording paper carried on the transfer drum.

In a case where images are formed on a plurality of sheets of recording paper simultaneously by such a color copier, the method employed is to affix the plural sheets of recording paper to the transfer drum and drive a reading optical system sheet by sheet to form the image on each sheet. For example, in a case where two sheets of recording paper have been affixed to the transfer drum, the reading optical system is driven twice to a magenta image (hereinafter referred to as the "M image") on each of the two sheets. Thereafter, and in similar fashion, the reading optical system is driven twice for recording of each of the cyan, yellow and black images to form these images on each of the two sheets.

In a color copier of this kind, the plurality of scans of the original for the purpose of multiple-image recording is carried out on the basis of a prescribed timing signal. For example, a prescribed position of the transfer drum is sensed by a sensor and scanning of the original for the purpose of recording each color is performed based upon the timing at which the prescribed position is sensed, thereby preventing a shift in the position at which each color-separated image is recorded.

FIG. 20 is a diagram for describing the gist of color superimposing recording operation. The latent image of a character "A" read from an original is formed on a photosensitive drum 191 rotating at a fixed speed, the latent image is developed by a magenta developing unit 151d, then the M image of the character A is formed on a sheet of recording paper 501 affixed to a transfer drum 127 rotating at a fixed speed. Next, the cyan image (hereinafter referred to as the "cyan image") of the character A developed by a cyan developing unit 151c is superimposed on the M image of the character A.

A timing signal for this color superimposing recording operation is generated when a flag plate 152 attached to the bottom of the transfer drum 127 cuts across a photosensor 153 secured independently of the transfer drum 127.

FIG. 21 is a diagram for describing the operation for recording a color image.

As shown in FIG. 21, the leading edge of the recording paper 501 is made to coincide with the leading edge of the recorded image by starting the reading of the original in the sub-scan direction a period of time T after the timing signal from the photosensor 153 rises.

More specifically, the reading of the original and the recording of the image in the sub-scan direction in the above-mentioned color copier start in response to a common signal (the timing signal from the photosensor 153), after which the reading of the original and the recording of the image are performed in response to a common synchronizing signal. As a result, images a, b on a dashed line 501a shown in FIG. 20 are read and recorded upon passage of times U, V, respectively, from the leading edge of the timing signal of photosensor 153 at the time of both magenta recording (hereinafter referred to as "M" recording) and cyan recording (hereinafter referred to as "C" recording).

Line reading and line recording of an original image are not synchronized to rotation of the transfer drum 127. Accordingly, even if the leading edge of the recording paper 501 is exactly at a position at which a line synchronizing signal is generated at the time of M recording, the leading edge of the recording paper 501 may not necessarily coincide with the line synchronizing signal at the time of C recording. As a result, the timing of reading of the original and recording of the image shifts with respect to the line synchronizing signal from one color to the next, as shown at C in FIG. 21, so that an apparent phase shift develops in the line synchronizing signal.

FIG. 22 is an enlarged view of an image signal in the vicinity of the image a in FIG. 20.

As shown in FIG. 22, the leading edge of the image a is read substantially midway between one line synchronizing signal and the immediately following line synchronizing signal at the time of M recording. Consequently, the leading edge portion of the image a is recorded at an intermediate density over a portion equivalent to one line. At the time of C recording, the trailing edge of the image a is read substantially midway between one line synchronizing signal and the immediately following line synchronizing signal, as a result of which the trailing edge portion is recorded at an intermediate density over a portion equivalent to one line. Thus, both the M and C images undergo a broadening of the image recording width owing to the discrepancy between the image of the original and the position of line sampling. However, since the recording density of the broadened portion is half that of the other portion, the center of density of the image is not displayed in either the M image or the C image.

Thus, in a case where the image read every line is recorded line by line in a color copier, both the reading of the image and the recording of the image begin a period of time T after the rise of the timing signal of photosensor 153 even though an apparent phase shift in the line synchronizing signal develops for each recorded color. As a result, no displacement or shift occurs in terms of the recorded image.

However, a drawback encountered in the above-described multiple-image recording method is slow recording speed. A technique for raising the recording speed is available for a case where an image is formed on a plurality of sheets of recording paper affixed to the transfer drum. Specifically, when an image is recorded on a first sheet of the recording paper, this image is also stored in memory. Then, when an image is recorded on sheets of the recorded paper from the second sheet onward, use is made of the stored image read out of the memory, thereby achieving the higher recording speed. This method is particularly advantageous since it eliminates the need for high-speed drive to return the reading optical system to the scanning starting position during rotation of the transfer drum 127 from one recording sheet on which image formation has been completed to the next recording sheet. It should be noted that the operation for writing the image in memory is performed every reading line, and that the operation for reading the image out of the memory is performed in synch with the line recording operation.

In another type of color copier, a memory is used in order to coordinate the image-reading scanning speed and the image recording speed. That is, color-by-color information of an original stored temporarily in a memory on the basis of a sub-scan synchronizing signal for the purpose of reading the original is read out of the memory based upon a sub-scan synchronizing signal for recording purposes, i.e., in conformity with the recording speed, thereby adjusting the difference between reading speed and recording speed.

However, in this technique using a memory, the sub-scan synchronizing signal for reading purposes is used for the reading timing of the original image and the sub-scan synchronizing signal for recording purposes is used for recording of the image stored in the memory. As a consequence, displacement between these two synchronizing signals accumulates over time and causes a shift (a color shift displacement) in the color-separated images.

FIG. 23 is a diagram from describing the occurrence of this color shift.

As in the case of FIG. 21 in which a memory is not used, the operation for reading an original begins after a time T from the leading edge of the timing signal from the photosensor 153. In other words, an image signal obtained by reading the image of an original is stored in a memory, with the initial line synchronizing signal that prevails the time T after the leading edge of the aforesaid timing signal being used as the synchronizing signal of the first line. Further, an image signal stored in the memory is read out with the initial line synchronizing signal prevailing the time T after the leading edge of the aforesaid timing signal being used as the synchronizing signal of the first line.

As shown in FIG. 23, when the M image is written in the memory and when the C image is written in the memory, the initial line synchronizing signal (indicated by the m mark), which rises upon elapse of the time T from the leading edge of the timing signal from photosensor 153, develops a time shift between these two writing operations. FIG. 23 shows that a delay of approximately one line occurs when the M image is written in the memory. On the other hand, when the M image is read out of the memory and when the C image is read out of the memory, the resulting time shift in the initial line synchronizing signal between these two reading operations is an advance of approximately one line when the M image is read out of the memory. In other words, in the state shown in FIG. 23, image signals $a_M$, $b_M$ of the M image are written in the memory as if they had been read one line earlier in comparison with image signals $a_C$, $b_C$ of the image C, and the image signals $a_M$, $b_M$ of the M image are read out at a timing one line earlier in comparison with the image signals $a_C$, $b_C$ of the image D.

When it is attempted to read the color-separated images out of the memory once these images have thus been written in the memory, the apparent phase shift in the line synchronizing signals of each color at the time of memory writing and the apparent phase shift in the line synchronizing signals of each color at the time of memory reading are added. There are instances in which this leads to a maximum shift (indicated at d in FIG. 23) of two lines in terms of the recording position. Further, in a case where image reading speed and image recording speed are make to conform using a memory and the sub-scan synchronizing signals for both reading and recording, there are instances in which this similarly leads to a maximum shift of two lines for each color in terms of the recording position.

SUMMARY OF THE INVENTION

Accordingly, an object of the present invention is to provide an image recording method and apparatus in which recording of an image on a recording medium from the second sheet onward is performed by an image signal read out of a memory, thereby raising recording speed and reducing a shift in multiple-image recording.

According to the present invention, the foregoing objects are attained by providing an image recording method in an apparatus having recording means for recording an image by superimposing images of different colors, comprising a reading step of starting reading of an image based upon a first timing signal, produced by the recording means, representing a recording-medium retention position; a processing step of processing an image signal, which has been obtained at the reading step, for obtaining an image signal of a prescribed color; a first recording step of storing the image signal, which has been obtained at the processing step, in memory means in synchronization with a synchronizing signal produced by the recording means, and recording this image signal of a first recording medium; and a second recording step of recording the image signal, which has been read out of the memory means in synchronization with the synchronizing signal, on a recording medium from a second recording medium onward.

Further, according to the present invention, the foregoing objects are attained by providing an image recording apparatus for recording an image by superimposing images of different colors, comprising: reading means for reading an image; processing means for processing an image signal, which has entered from the reading means, for obtaining an image signal of a prescribed color; memory means for storing the image signal, which has entered from the processing means, in synchronization with a synchronizing signal, and outputting this stored image signal in synchronization with the synchronizing signal; and recording means for retaining at least one recording medium, recording the image signal, which has entered from the processing means, on a first recording medium, and recording the image signal, which has entered from the memory means, on a recording from a second recording medium onward.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An image recording apparatus according to embodiments of the invention will now be described in detail.

First Embodiment

Figure 1:
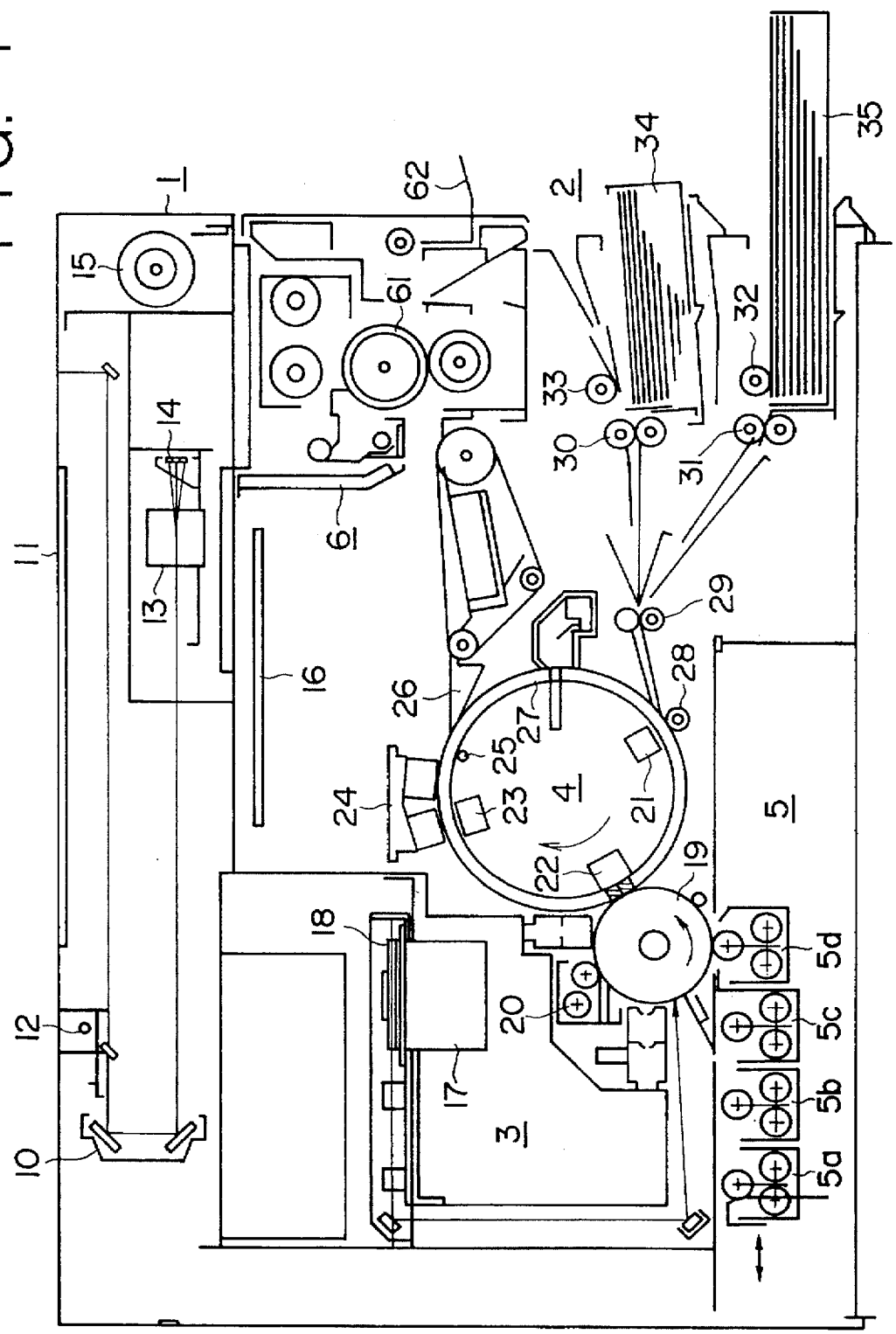
FIG. 1 is a diagram illustrating the construction of a full-color electrophotographic copier according to a first embodiment of the present invention.

FIG. 1 is a diagram illustrating the construction of a full-color electrophotographic copier according to a first embodiment of the present invention.

As shown in FIG. 1, a reader 1 comprises a platen 11, an illuminating lamp 12, an image forming lens 13, an image sensing device 14, an original scanning unit 10 and an optical-system drive motor 15.

The image sensing device 14 is a three-line CCD in which R, G, B color filters are arranged side by side. Light reflected from an original placed on the platen 11 is projected upon each of the R, G, B line sensors.

The well-known original scanning unit 10, which travels together with the illuminating lamp 12 to perform scanning, is moved by the optical-system drive motor 15 at a constant speed determined in conformity with a preset copying magnification, thereby reading the image of the original placed on the platen 11. In this embodiment, reading of the original is performed a total of four times in correspondence with the recording of each developed color in order to successively record each of the development colors magenta, cyan, yellow and black.

Though not shown in FIG. 1, a control panel 51, the details of which will be described later, is provided at the periphery of the platen 11 and has switches for setting various modes related to the copying sequence, as well as a display and indicators for displaying the operating mode of the embodiment and the status of operation.

A paper feeding unit 2 includes paper feeding rollers 30, 31 and pick-up rollers 32, 33. Paper cassettes 34, 35 are loaded in the paper feeding unit 2, which supplies the recording paper to a transfer unit, described later, in accordance with a drive command from the controller 16.

An image forming unit 3 comprises a scanner motor 17, a polygon mirror 18, a photosensitive drum 19 and a cleaner 20. The controller 16 processes a color image signal outputted by the image sensing device 14, thereby producing color-separated image signals for the colors magenta, cyan, yellow and black. A laser beam emitted by a laser light source in conformity with the color-separated image signals is made to scan across the photosensitive drum 19 by the polygon mirror 18 so as to form an electrostatic latent image of each color on the photosensitive drum 19.

The transfer unit 4 comprises an attracting corona discharge unit 21, a transfer corona discharge unit 22, separating corona discharge units 23, 24, a separating pressure roller 25, a separating finger 26, a transfer drum 27, an attracting roller 28 and a resist roller 29. Recording paper that has been sent to the position of the resist controller 29 by the paper feeding rollers 30, 31 is delivered by the resist roller 29 to a position over the transfer drum 27 that coincides with the position of the beginning of the image on the photosensitive drum 19. The recording paper is electrostatically attracted to the outer peripheral surface of the transfer drum by the attracting roller 28 and attracting corona discharge unit 21, which constitute opposing electrodes. A toner image on the photosensitive drum 19 is transferred by the transfer corona discharge unit 22 to the recording paper that has been fixedly attracted to the transfer drum 27.

A developing unit 5 comprises developing devices 5a~5d. The developing devices 5a~5d are moved back and forth in the direction of the arrows by a developing-device motor 119, described later, so as to move a developing sleeve to the developing position of the photosensitive drum 19. The developing devices 5a~5d accommodate black, yellow, cyan and magenta toners, respectively, and develop the electrostatic latent image on the photosensitive drum 19 using toners of the prescribed color. First the M image is developed using the magenta developing device 5d and the developed image is then transferred to the recording paper that has been fixedly attracted to the transfer drum 27. Next, the C image is developed using the cyan developing device 5c and the resulting C image is transferred to the recording paper to which the M image has already been transferred. Similarly, the yellow and black images are superimposed upon and transferred to the recorded paper, in the order mentioned, to which the M and C images have already been transferred.

A fixing unit 6 comprises a fixing roller 61 and a tray 62. Recording paper peeled off the transfer drum 27 by the separating finger 26 has its toner fixed by the fixing roller 61, after which the recording paper is discharged into the tray 62.

Figure 2:
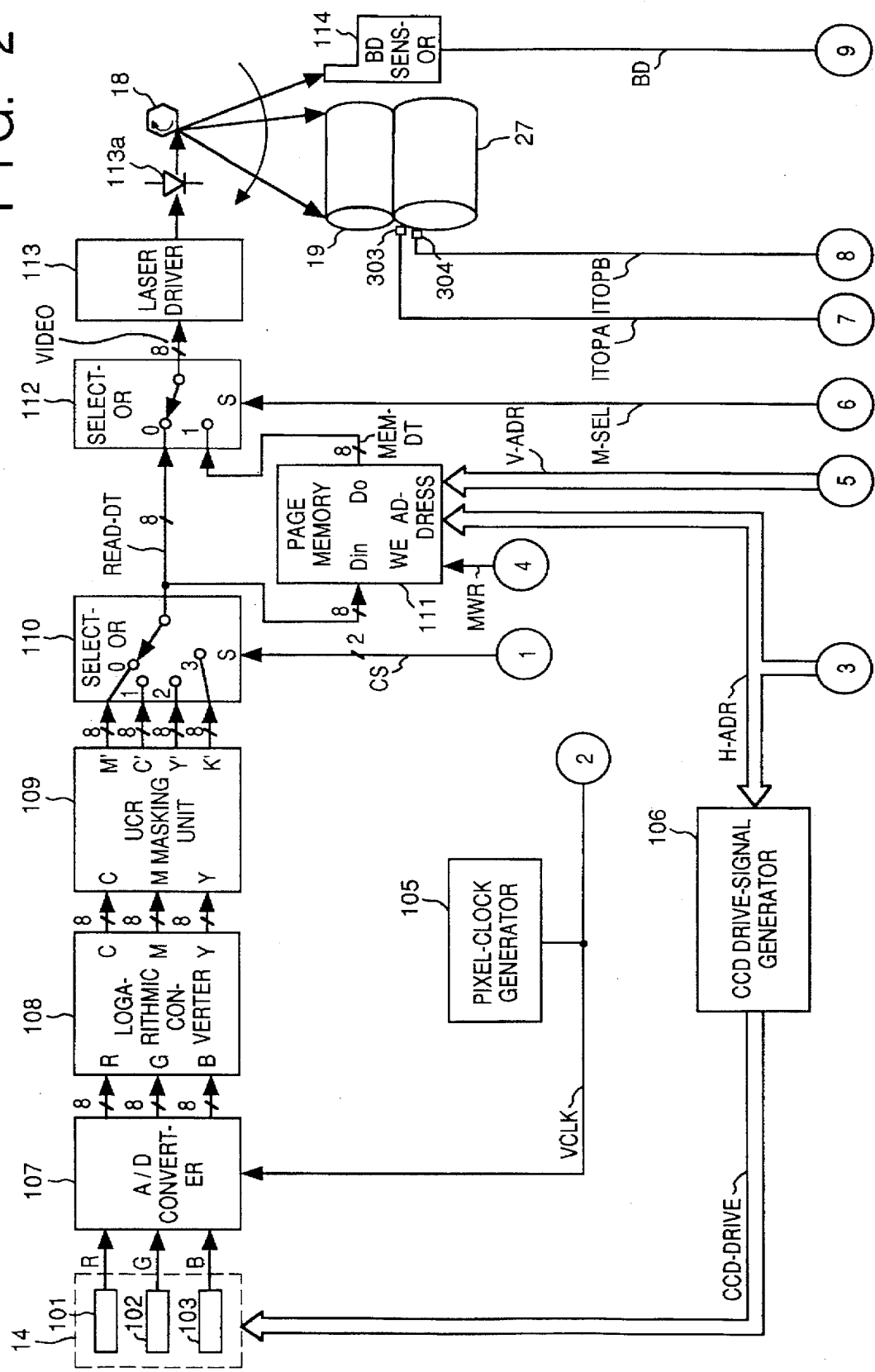
FIGS. 2 and 3 are block diagrams illustrating the construction of a controller and peripheral devices according to this embodiment.
Figure 3:
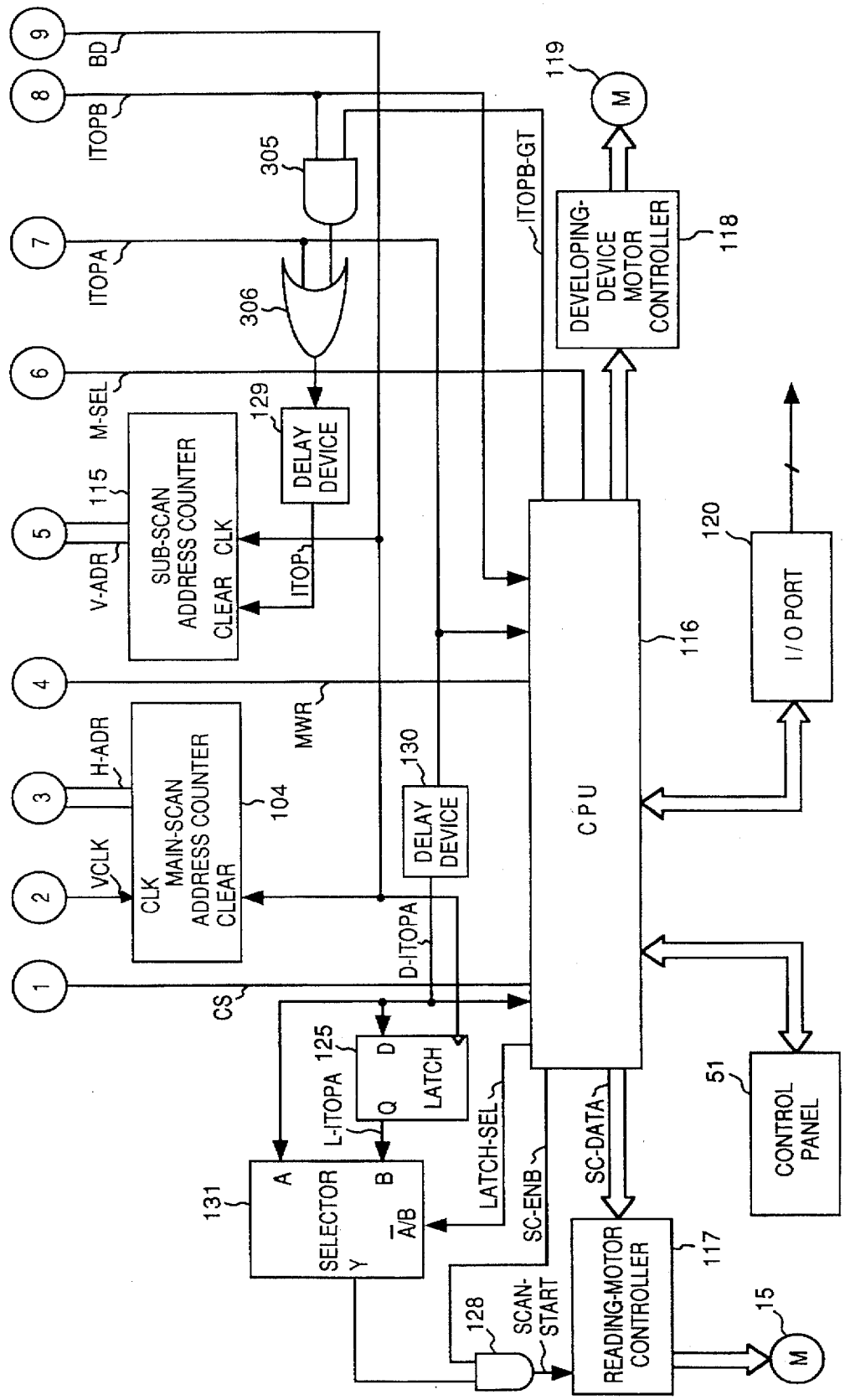

FIGS. 2 and 3 are block diagrams illustrating the construction of a controller 16 and peripheral devices according to this embodiment.

As shown in FIG. 2, the image sensing device, which is composed of three-line CCDs of a CCD 101 for R, a CCD 102 for G and a CCD 103 for B, separates the light 20 reflected from the original into colors and outputs an RGB signal commensurate with the intensity of light. If the resolution of the image sensing device 14 is, say, 400 dpi, each CCD is required to have 4,677 pixels per line (a maximum of 297 mm) in order to read an original image of size A4.

A main-scan address counter 104 in FIG. 3 is cleared by a line synchronizing signal BD whenever the recording of one line is completed, counts a clock VCLK and outputs a 13-bit count signal H-ADR corresponding to each pixel of one line of image information outputted by the CCD 14. The line synchronizing signal BD is produced by a BD sensor 114, which is disposed in the proximity of the photosensitive drum 19, for sensing the laser beam directly before it scans the drum. The clock VCLK is generated by a pixel-clock generator 105.

A CCD drive-signal generator 106 decodes the H-ADR signal and generates a signal CCD-DRIVE, which includes a CCD shift pulse, reset pulse and a transfer clock. Since the H-ADR signal is counted up from 0 to 5000, for example, one line of an image signal is capable of being read fully from the CCDs 101~103. As a result, the CCDs 101~103 successively output RGB color-separated image signals for one and the same pixel in synchronism with the clock VCLK.

An A/D converter 107 converts each of the R, G, B image signals from the image sensing device 14 into an eight-bit digital image signal. A logarithmic converter 108 converts R, G, B luminance signals from the A/D converter 107 into eight-bit C, M, Y density signals.

A UCR/masking unit 109 applies known UCR processing to the C, M, Y density signals from the logarithmic converter 108 to extract a density signal for the color black (K), and executes a known masking operation to remove blurring of developer corresponding to each density signal.

In dependence on a two-bit signal CS which enters a selection terminal S from a CPU 116, described later, a selector 110 selects a signal of a color, which is about to to be formed, from among density signals M', C', Y', K' that have entered from the UCR/masking unit 109. The relationship between the signal CS and the selected density signal is as follows: M' when CS is 0, C' when CS is 1, Y' when CS is 2 and K' when CS is 3.

A sub-scan address counter 115, which is cleared by a page-start signal ITOP, described in detail below, counts the line synchronizing signal BD and outputs a 13-bit count signal V-ADR corresponding to each line.

A page memory 111 has a storage capacity for size A4 of a color image. The count signal H-ADR from the main-scan address counter 104 is supplied to a lower-order address terminal of the page memory 111, and the signal V-ADR from the sub-scan address counter 115 is supplied to a lower-higher address terminal of the page memory 111. Thus, the address of the page memory 111 is generated in synch with image reading and image recording in page units. The changeover in the read/write mode of the page memory 111 is performed by a signal MWR outputted from a port of the CPU 116, described later. The write mode is attained in a case where the signal MWR is at the "H" level and the read mode is attained in a case where the signal MWR is at the "L" level.

Figure 5:
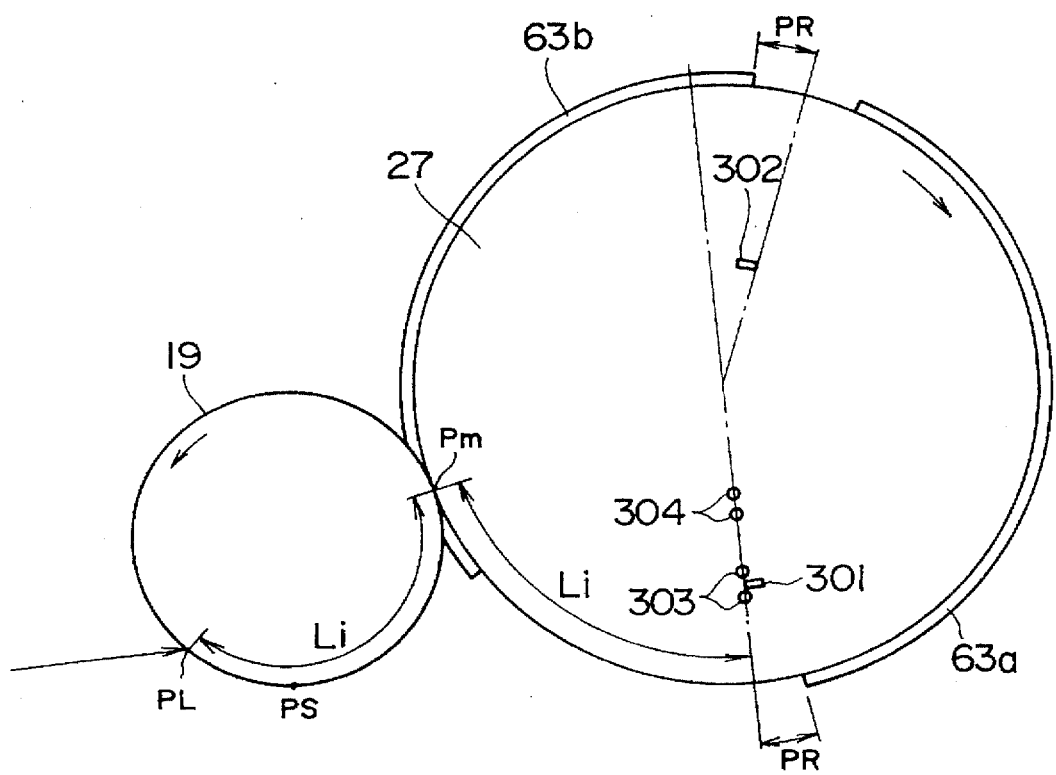
FIG. 5 is a diagram showing a photosensitive drum and a transfer drum included in the copier of FIG. 1.

The method of generating the page-start signal ITOP is as follows:

A signal ITOPB outputted by a photosensor 304 arranged in close proximity to the transfer drum 27 and a signal ITOPB-GT outputted from a portion of the CPU 116 are AND-ed by an AND gate 305. Further, the output of the AND gate 305 and a signal ITOPA outputted by a photo-sensor 303 arranged in close proximity to the transfer drum 27 are OR-ed by an OR gate 306. A delay device 129 applies a delay equivalent to time T to the output of the OR gate 306, as a result of which the page-start signal ITOP is produced. As shown in FIG. 5, the time T corresponds to the period of time the transfer drum 27 needs to rotate by an amount equivalent to the distance (length PR of an arc) between the distal end of a flag plate 301 (or 302) and the leading edge of a sheet of recording paper 63a (or 63b).

With reference again to FIGS. 2 and 3, a selector 112 selects, in dependence upon a selection signal M-SEL inputted from a port of the CPU 116 to a selection terminal S, either image data READ-DT obtained by real-time processing of the image signal read by the image sensing device 14, or image data MEM-DT read out of the page memory 111.

A laser driver 113 controls the amount of light emitted by a laser element 113a in dependence upon an image signal VIDEO that has entered from the selector 112. The laser light emitted by the laser element 113a is made to scan in the axial direction of the photosensitive drum 19 by the polygon mirror 18, thereby forming an electrostatic latent image on the photosensitive drum 19.

A CPU 116, which comprises a microcomputer, a ROM and a RAM, etc., controls the image reading operation and image recording operation, in dependence upon the timings of the input signals ITOPA, ITOPB and an input signal D-ITOPA, described later, in accordance with a program that has been stored in the ROM.

Numeral 117 denotes a reading motor controller which, on the basis of a signal SC-DATA entering from the CPU 116, is set to a reading scanning length and a reading scanning speed and controls the forward/reverse operation and speed of the reading motor 15 in dependence upon the setting. It should be noted that the reading motor controller 117 obtains scan starting timing based upon the leading edge of a signal SCAN-START, described later.

The signal SCAN-START is generated in the following manner:

The signal ITOPA outputted by the photosensor 303 is delayed by a delay device 130 to obtain the signal D-ITOPA. The delay device 130 delays the signal ITOPA by the time T, in the same manner as the delay device 129.

The signal D-ITOPA enters a latch 125, from which the signal is outputted as a signal L-ITOPA synchronized to the line synchronizing signal BD. A selector 131 selects either the signal D-ITOPA or the signal L-ITOPA in dependence upon a signal LATCH-SEL applied to a selection terminal from the CPU 116. The signal selected and outputted by the selector 131 is applied to an AND gate 128, where the signal is AND-ed with a signal SC-ENB outputted by the CPU 116, as a result of which a SCAN-START signal is obtained.

Numeral 118 denotes a developing-device motor controller which, is accordance with a signal from the CPU 116, controls the developing-device motor 119 in such a manner that a prescribed developing device is moved to the developing position of the photosensitive drum 19.

An I/O port 120, which is interposed between the CPU 116 and sensors and actuators, other than those mentioned above, necessary for controlling the copying operation, is for inputting/outputting signals from/to these sensors and signals for controlling the actuators. These signals include a signal PF, which commands supply of recording paper from the paper cassettes 34, 35.

The control panel 51 sends commands entered by the user to the CPU 116 and displays the operating status of this embodiment, this status being transmitted by the CPU 116.

Figure 4:
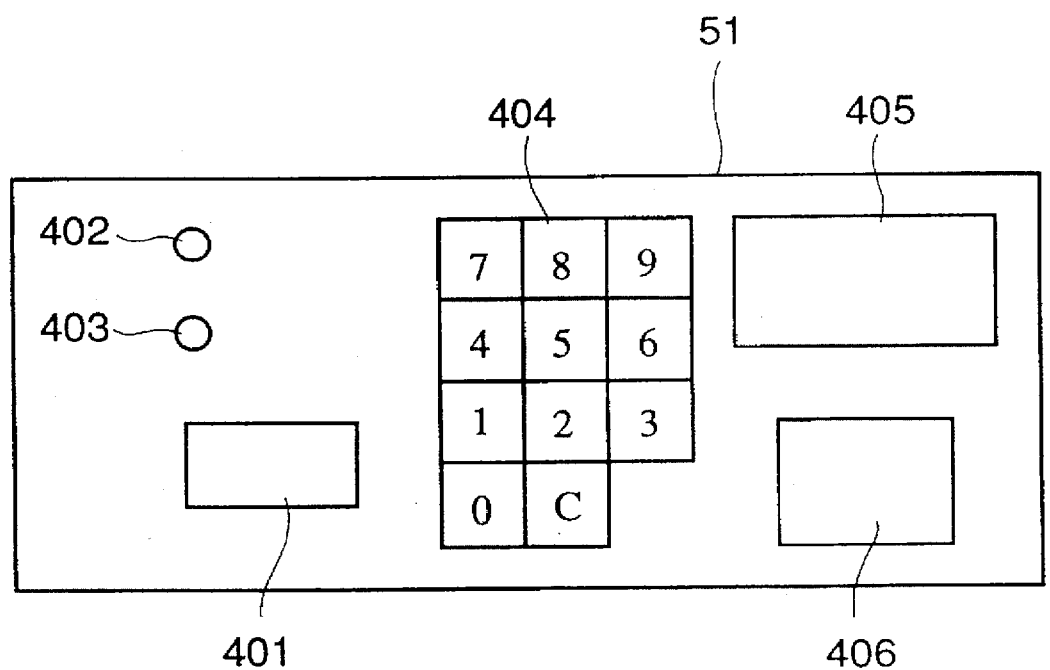
FIG. 4 is a diagram showing the arrangement of a control panel according to this embodiment.

FIG. 4 is a diagram illustrating the arrangement of the control panel 51. The control panel 51 includes a select key 401 for selecting a paper cassette, an indicator 402 illustrating that the upper cassette has been selected, an indicator 403 illustrating that the lower cassette has been selected, a key 404 for setting number of copies, a display 405 for illustrating the number of copies set and the operating status of this embodiment, copy start key 406.

Figure 6A:
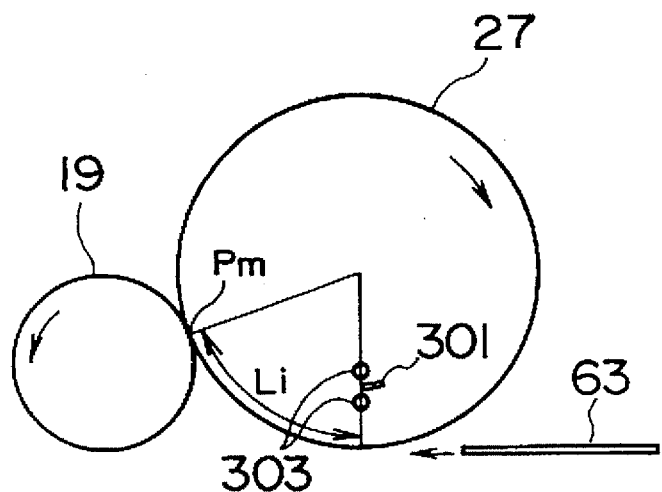
FIGS. 6A and 6B are diagrams for describing the timing at which recording paper is fixedly attracted to the transfer drum.
Figure 6B:
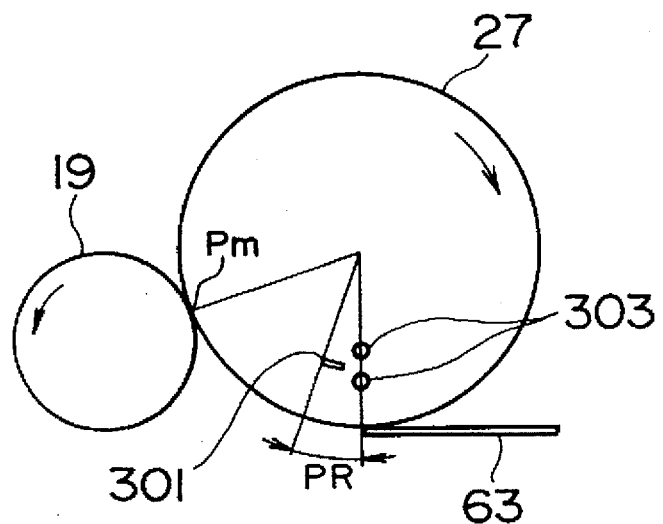

FIG. 5 is a diagram illustrating the photosensitive drum 19 and the transfer drum 27, and FIGS. 6A, 6B are diagrams for describing the timing at which recording paper is fixedly attracted to the transfer drum 27.

As shown in FIG. 5, the diameter of the transfer drum 27 is 160 mm and the perimeter thereof 502.6 mm. Accordingly, one sheet of paper of size A3, B4 or so-called "leisure size" paper, the length whereof is greater than half of the perimeter of the transfer drum 27, can be fixedly attracted to the transfer drum 27. Further, two sheets of letter-size recording paper or two sheets of recording paper of size A4, the length whereof is less half the perimeter, can be fixedly attracted to the transfer drum 27. In FIG. 5, two sheets of size A4 recording paper 63 are shown fixedly attracted to the transfer drum 27.

Though the size of the transfer drum 27 has been illustrated in order to clarify the invention, it should be noted that the embodiment is not limited to this size and that a transfer drum of any size can be used.

The flag plates 301, 302 are disposed on the bottom side of the transfer drum 27 at mutually different radii and rotate with the drum. The transfer unit 4 has a housing (not shown) on which the photosensors 303, 304 are secured so as to sense passage of the flag plates 301, 302, respectively.

A latent image that has been formed on the photosensitive drum 19 at the circumferential position PL is developed at the position PS and a toner image is transferred to the recording paper 63, which has been fixedly attracted to the transfer drum 27, at position Pm of contact between the transfer drum 27 and the photosensitive drum 19. Let Li represent the length of the arc from the latent-image forming position PL to the transfer position Pm.

The recording paper 63 is sent to and fixedly attracted to the transfer drum 27 based upon the timing at which the flag plate 301 arrives at the photosensor 303 or the timing at which the flag plate 302 arrives at the photosensor 304. More specifically, the CPU 116 outputs the signal PF when the output of the photosensor 302 rises, as a result of which the recording paper 63 is supplied, as shown in FIG. 6A. When the transfer drum 27 has rotated by an amount equivalent to the arc length PR shown in FIG. 6A, the recording paper 63 is fixed attracted to the transfer drum 27, as shown in FIG. 6B. In other words, in consideration of the timing at which the flag plate 301 arrives at the photosensor 303, the leading edge of the recording paper 63a becomes affixed at a position Li+PR, which is the sum of the length Li of the arc of the transfer drum 27 from the transfer position Pm to the photosensor 303 and the above-mentioned length PR of the arc. Similarly, in consideration of the timing at which the flag plate 302 arrives at the photosensor 304, the leading edge of the recording paper 63b becomes affixed at the position having the distance Li+PR from the transfer position Pm.

Accordingly, if scanning of the reading optical system and, hence, formation of the latent image on the photosensitive drum 19, is started after waiting for the transfer drum 27 to rotate by the amount of the arc length PR after the output of the photosensor 303 (or 304) rises, namely until the state shown in FIG. 6B is attained, then the leading edge of the image formed will be transferred to the leading edge of the recording paper 63a (or 63b). That is, the waiting time corresponds to the aforesaid time T.

According to this embodiment, if the recording paper is of size A3, B4 or of leisure size, the leading edge of the recording paper will become affixed at the position of the leading edge of the recording paper 63a in FIG. 5. Therefore, the output ITOPA of the photosensor 303 is used as the synchronizing signal indicating the leading edge of the image.

The operation for forming an image according to this embodiment will now be described.

Figure 7:
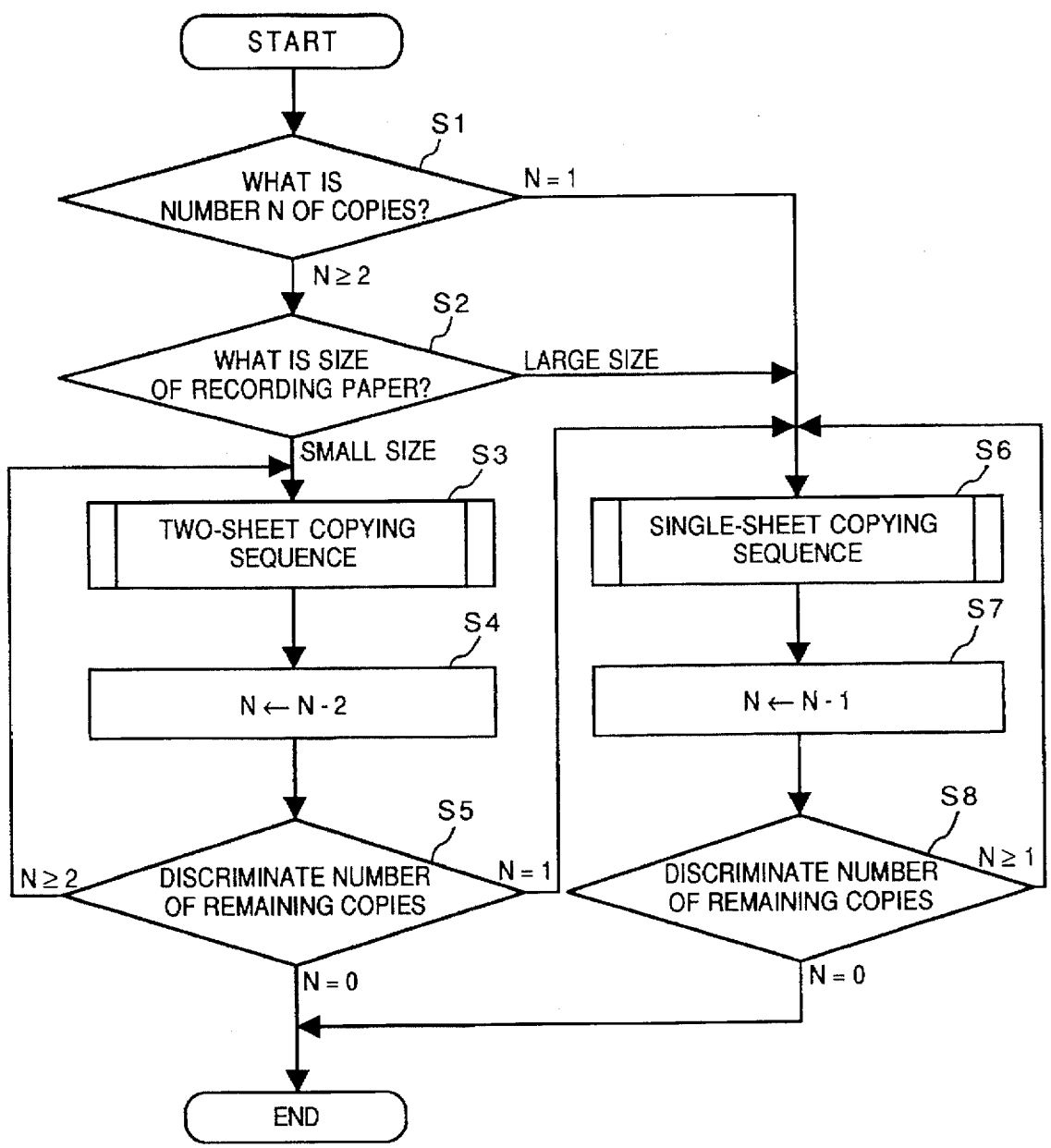
FIG. 7 is a flowchart illustrating the procedure of a copying operation according to this embodiment.

FIG. 7 is a flowchart illustrating the procedure of a copying operation according to this embodiment. This procedure is executed by the CPU 116 when the copy start key 406 is pressed.

As shown at step S1 in FIG. 7, the CPU 116 discriminates a number N of copies set and proceeds to step S6 if N=1 holds or to step S2 if N≧2 holds.

In case of N>1, the CPU 116 discriminates the size of the recording paper at step S2. The program proceeds to step S3 if the recording paper is of small size or to step S6 if the recording paper is of large size. The small size mentioned here refers to a size, such as A4 or leisure, that allows two sheets to be fixedly attracted to the transfer drum 27 simultaneously. The large size signifies a size, such as A3 or B4, that allows only one sheet to be fixedly attracted to the transfer drum 27.

If the recording paper is of small size, a "two-sheet copying sequence" is executed at step S3. This is followed by step S4, at which N-2 is substituted into the set number N of copies, and then by step S5, at which the remaining number of copies is discriminated. If N>2 is found to hold at step S5, the program returns to step S3. If N=1 is found to hold at step S5, the program returns to step S6. Processing is terminated if N=0 is found to hold at step S5.

If N=1 is found hold at step S1 or S5, or if the large size is discriminated at step S2, a "single-sheet copying sequence" is executed at step S6. This is followed by step S7, at which N-1 is substituted into the set number N of copies, and then by step S8, at which the remaining number of copies is discriminated. If N>1 is found to hold at step S8, the program returns to step S6. Processing is terminated if N=0 is found to hold at step S8.

Two-Sheet Copying Sequence

Figure 8:
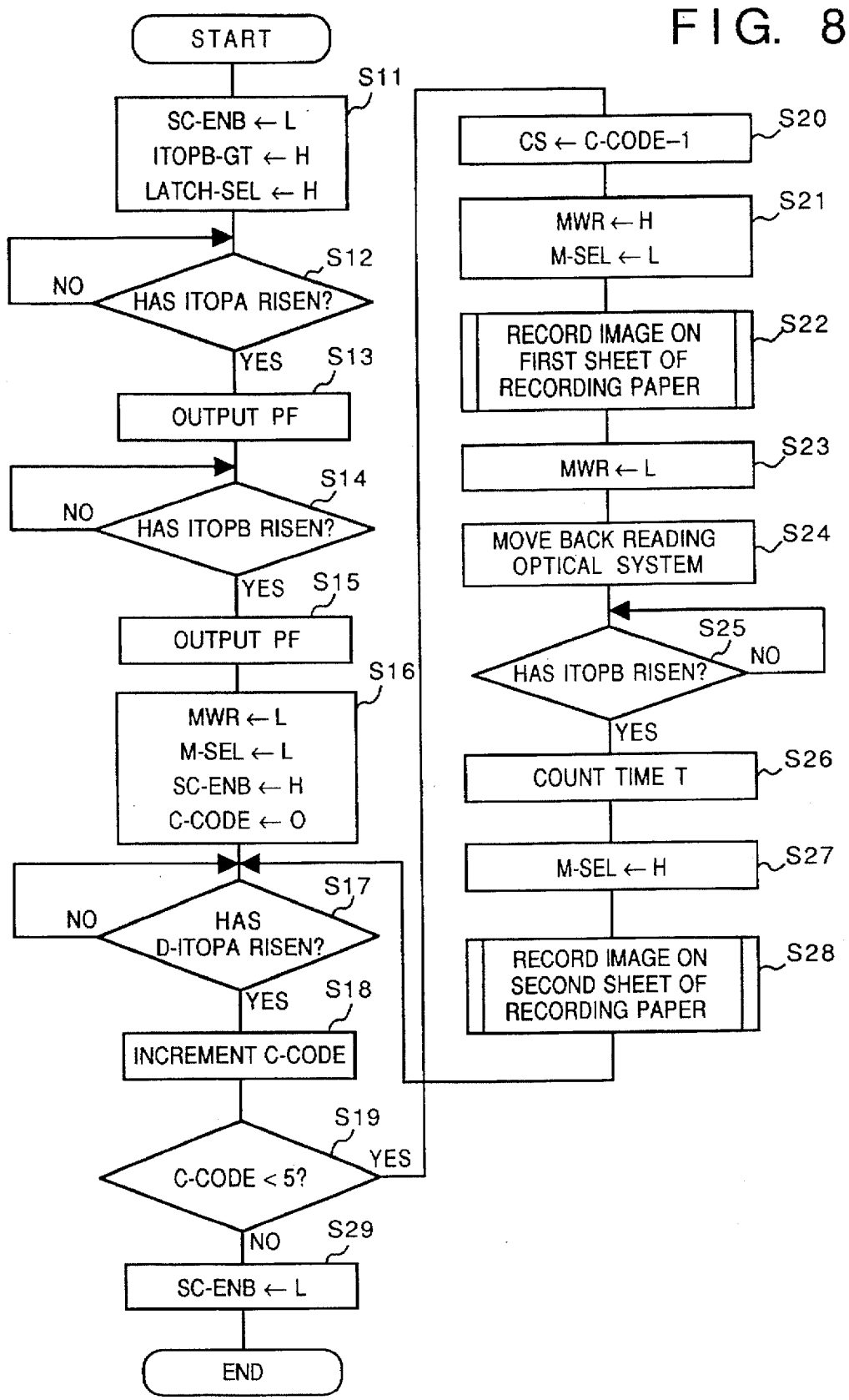
FIG. 8 is a flowchart illustrating a "two-sheet copying sequence" included in the flowchart of FIG. 7.

FIG. 8 is a flowchart illustrating the "two-sheet copying sequence".

As shown in FIG. 8, the CPU 116 executes step S11, at which the signal SC-ENB is made "L" to inhibit the signal SCAN-START, and the signal LATCH-SEL is made "H" to generate the signal SCAN-START at the timing of the signal L-ITOPA. Further, the CPU 116 raises the signal ITOPB-GT to "H" to generate the signal ITOP from either the signal ITOPA or ITOPB.

Next, at step S12, the CPU 116 waits for the signal ITOPA to rise. When this signal rises, the signal PF is outputted at step S15. Accordingly, the first sheet of recording paper 63a is supplied.

Next, at step S16, the CPU 116 waits for the signal ITOPB to rise. When this signal rises, the signal PF is outputted at step S15. Accordingly, the second sheet of recording paper 63b is supplied.

Next, at step S16, the CPU 116 sends the signal MWR and the signal M-SEL to the "L" level, inverts the signal SC-ENB to the "H" level to enable the signal SCAN-START and sets a register C-CODE, which is provided in an internal memory (not shown), to 0.

The CPU 116 then waits for the signal D-ITOPA to rise at step S17. That is, the CPU 116 waits for the timing at which image recording starts on the first sheet of recording paper 63a affixed to the transfer drum 27.

When the signal D-ITOPA rises and the signal L-ITOPA rises in synch with the line synchronizing signal BD, the AND gate 128 outputs the signal SCAN-START and the reading-motor controller 117 starts driving the reading motor 15. It should be noted that the register C-CODE is a register for representing the recording color. The CPU 116 increments the register CCODE at step S18. The relationship between the value in the register and the recording color is as follows: 1, 2, 3 and 4 represent magenta (M), cyan (C), yellow (Y) and black (K), respectively.

This is followed by step S19, at which it is determined, based upon the value in the register C-CODE, whether the recording of each of the four colors has ended. More specifically, the program proceeds to step S20 if C-CODE<5 holds (this indicates that there is an unrecorded color) and to step S29 if C-CODE=5 holds. At step S29, the signal SC-ENB is made "L" and processing is terminated.

If C-CODE<5 holds, then C-CODE-1 is outputted as the signal CS at step S20 and the selector 110 selects the color signal that conforms to the signal CS.

The signal MWR is made "H" and the signal M-SEL is made "L" at step S21. Then, at step S22, the reading motor 15 is driven by the reading-motor controller 117 to advance the reading optical system, image data READ-DT is stored in the page memory 111 and an image represented by the image data READ-DT is recorded on the first sheet of recording paper 63a.

When scanning of the original image ends, the signal MWT is made "L" at step S23 to end the writing of the page memory 111. Then, at step S24, the reading motor 15 is driven by the reading-motor controller 117 to retract the reading optical system so that the latter is returned to the reading starting position.

Next, at step S25, the CPU 116 waits for the signal ITOPB to rise. When this signal rises, the time T is counted at step S26, after which the signal M-SEL is made "H" at step S27. Then, at step S28, the image data MEM-DT that has been stored in the page memory 111 is read out and the image is recorded on the second sheet of recording paper 63b, at which the program returns to step S17.

Figure 9:
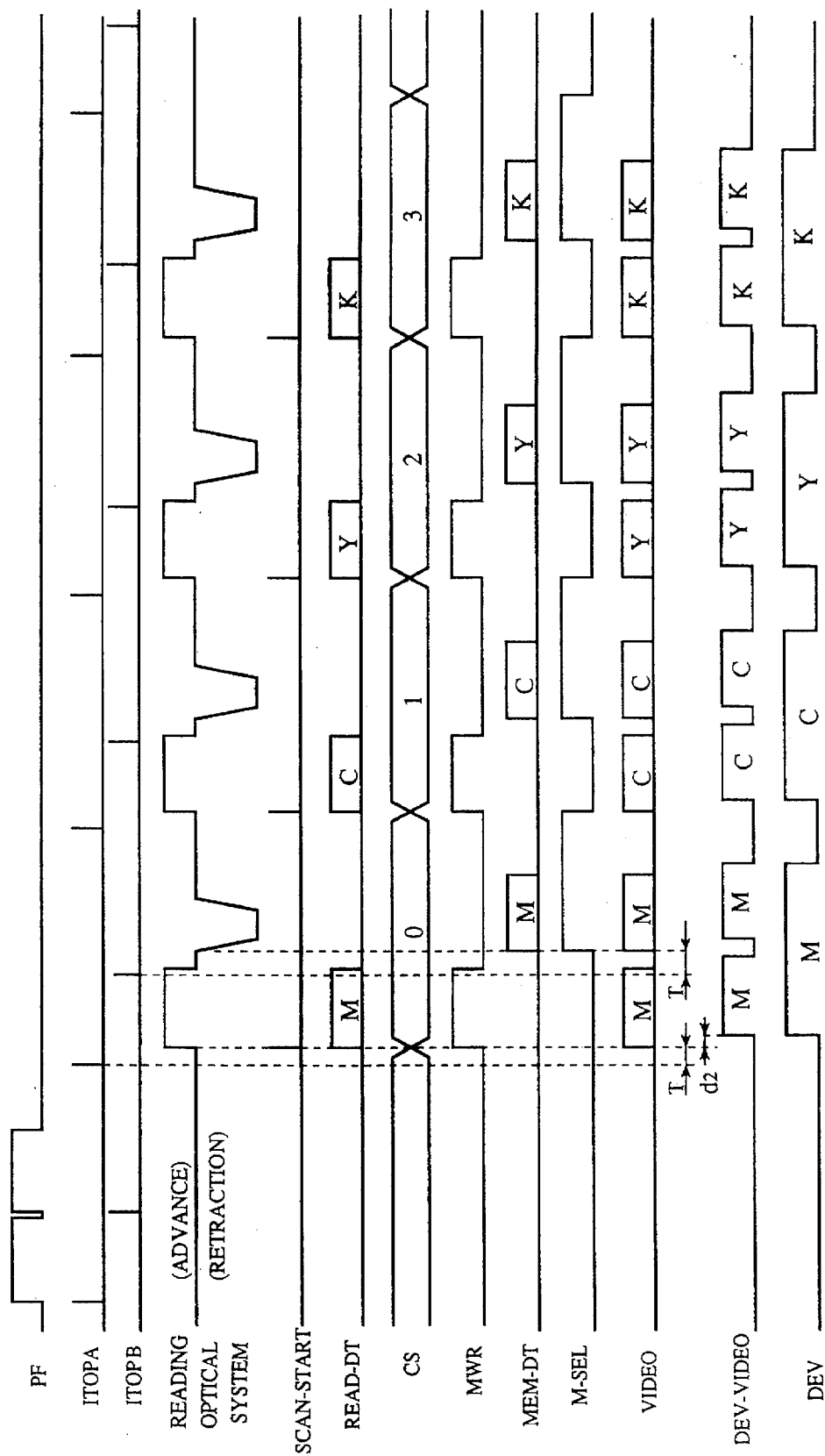
FIG. 9 is a timing chart of the "two-sheet copying sequence" according to this embodiment.

FIG. 9 is a timing chart of the "two-sheet copying sequence".

As shown in FIG. 9, the signal PF rises two times in succession in conformity with the signals ITOPA and ITOPB and two sheets of the recording paper 63 are fixedly attracted to the transfer drum 27 one after the other.

Next, the signal D-ITOPA rises upon elapse of the time T from the rise of the signal ITOPA, and the signal L-ITOPA rises in synch with the line synchronizing signal BD, whereupon the reading optical system is advanced to obtain an image signal of the original. At this time the signal CS is 0, the signal MWR is "H" and the signal M-SEL is "L". As a result, the M-image signal is supplied to the page memory 111 and selector 112 as the image data READ-DT, the page memory 111 stores the image data READ-DT and the selector 112 selects the image data READ-DT and outputs it as the image signal VIDEO. Accordingly, the M image represented by the image data READ-DT, obtained by real-time processing of the image signal read by the image sensing device 14, is recorded on the first sheet of recording paper 63a. When the scanning of the original by the reading optical system ends, the signal MWR attains the "L" level.

Next, upon elapse of the time T from the rise of the signal ITOPB, the reading optical system is retracted and the signal M-SEL attains the "H" level. As a result, the selector 112 selects the image data read out of the page memory 111 and outputs this data as the image signal VIDEO. Accordingly, the M image represented by image data MEM-DT that has been stored in the page memory 111 is recorded on the second sheet of recording paper 63b. It should be noted that the optical reading system is returned to the reading starting position at a comparatively low speed during the image recording period of the second sheet of recording paper.

A signal DEV-VIDEO shown in FIG. 9 indicates the timing at which the electrostatic latent image formed on the photosensitive drum 19 reaches the developing position PS. In other words, the latent image formed at the latent-image forming position PL reaches the developing position PS after a time d2. The CPU 116 causes the latent image of each recording color to be developed using the developing device of the color indicated by DEV.

From this point onward, images are formed on the recording paper in the order of the C image, Y image and K image, after which the image recording operation is concluded.

Thus, in the "two-sheet copying sequence", two sheets of recording paper of small size are fixedly attracted to the transfer drum 27, and recording of an image on the first sheet 63a is performed by an image signal obtained by driving the reading optical system at the timing of the signal L-ITOPA. The recording of an image on the second sheet 63a is performed by reading the image signal, used in recording the image on the first sheet, out of the page memory 111.

Figure 10:
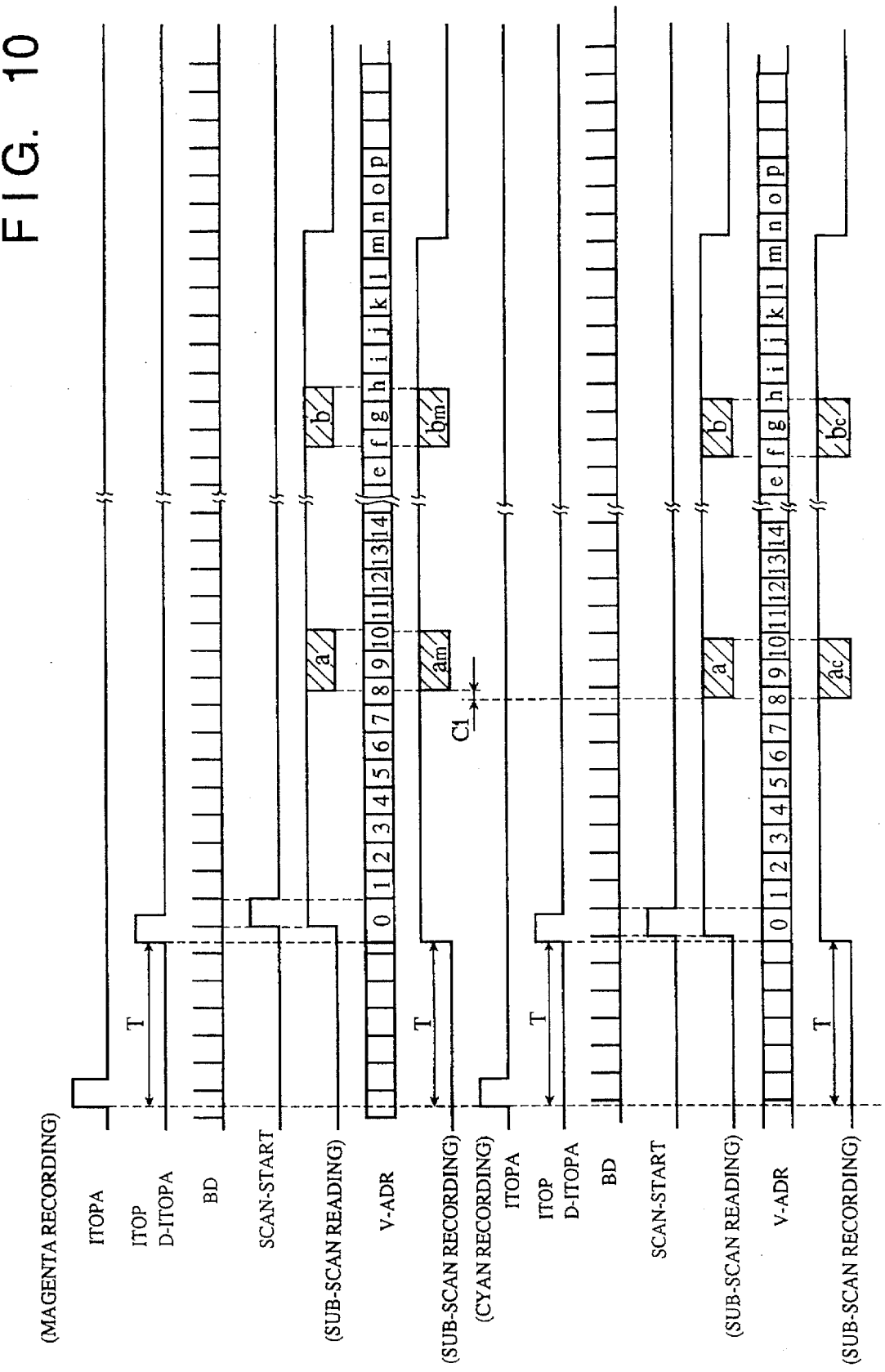
FIG. 10 is a diagram for describing color shift on a single sheet of recording paper in this embodiment.
Figure 11:
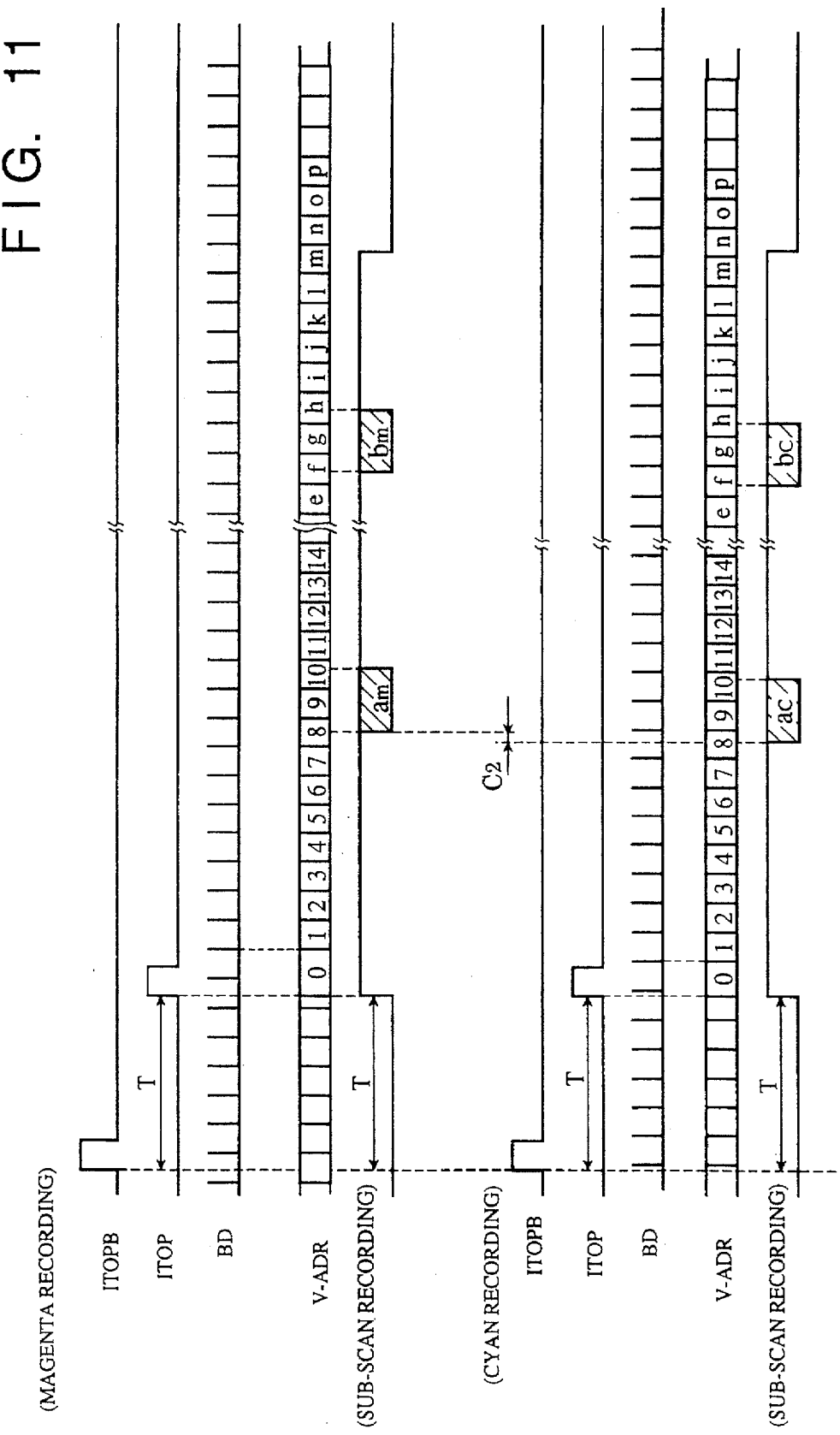
FIG. 11 is a diagram for describing color shift on two sheets of recording paper in this embodiment.
Figure 20:
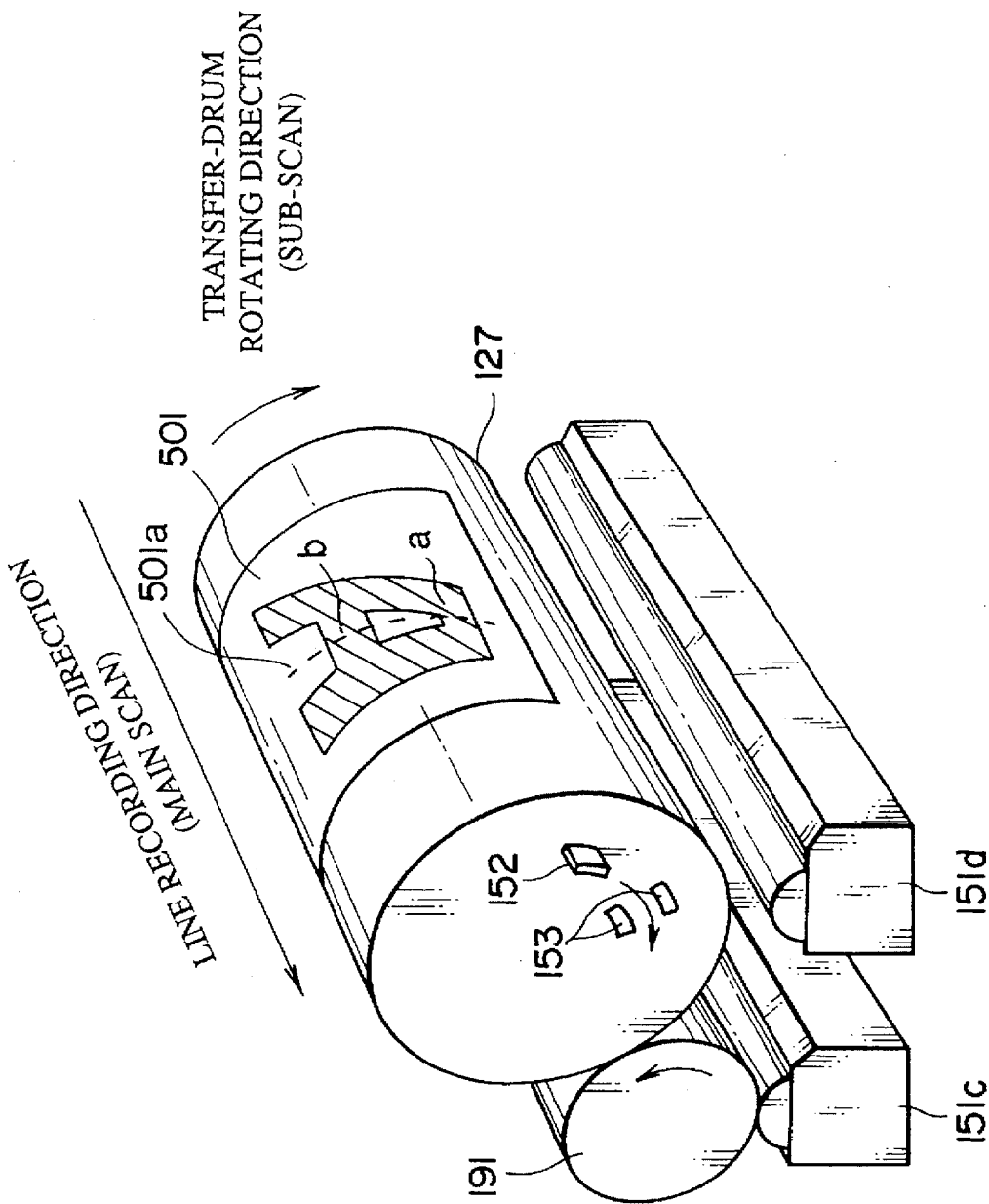
FIG. 20 is a diagram for describing the gist of a color-superimposing recording operation.
Figure 21:
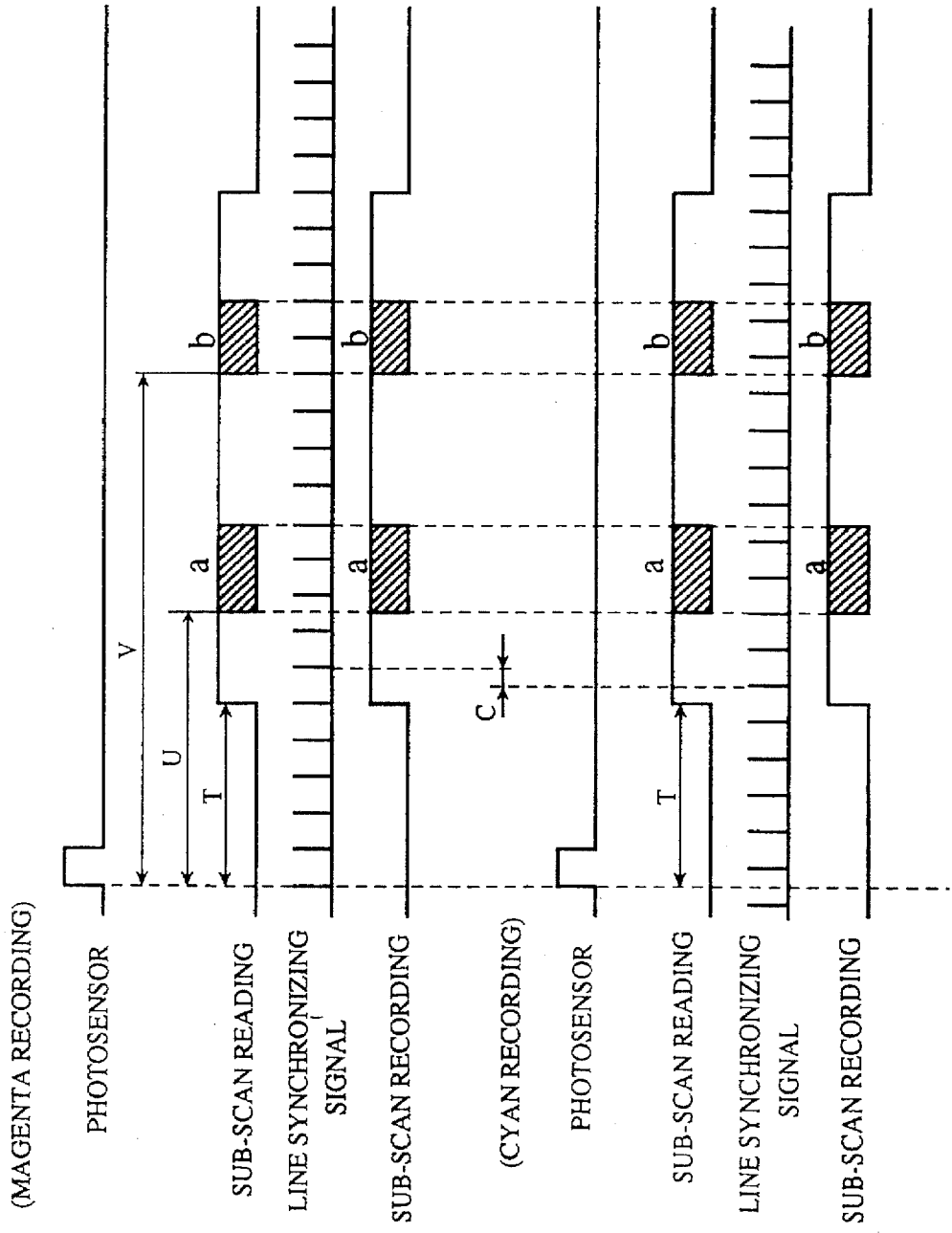
FIG. 21 is a diagram for describing an operation for recording a color image.
Figure 22:
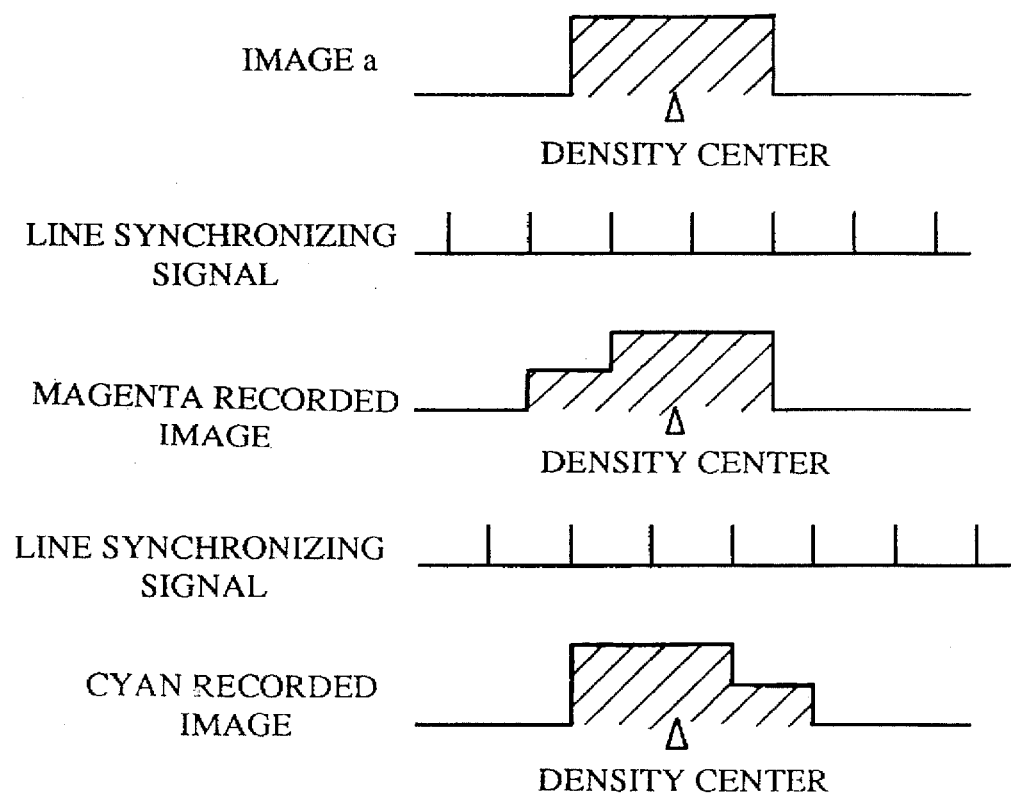
FIG. 22 is an enlarged view of an image signal in the vicinity of an image a in FIG. 20.
Figure 23:
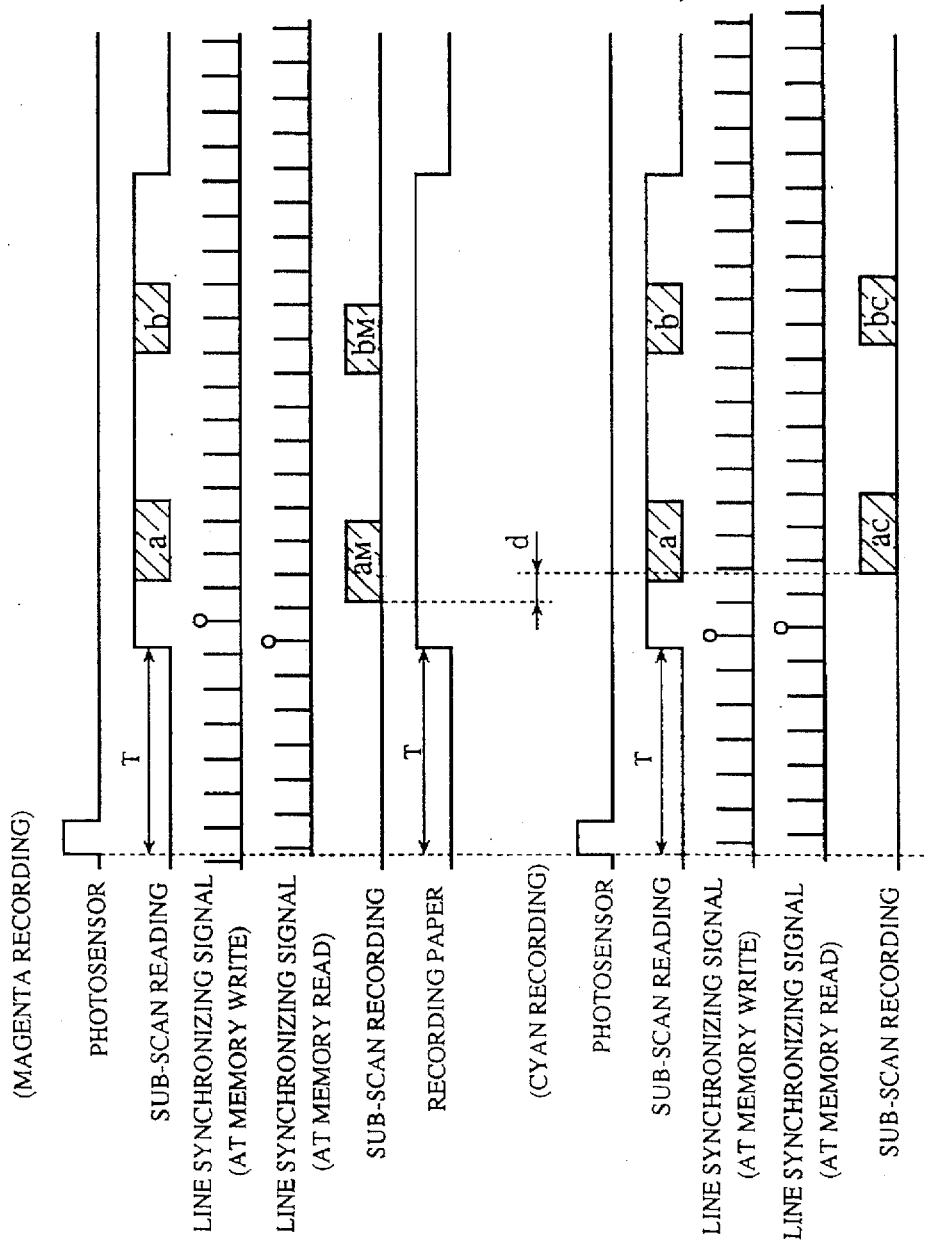
FIG. 23 is a diagram for describing the occurrence of a color shift.

FIGS. 10 and 11 are diagrams for describing color shift in the "two-sheet copying sequence". FIG. 10 illustrates color shift on the first sheet of recording paper 63a, and FIG. 11 illustrates color shift on the second sheet of recording paper 63b. Both diagrams illustrate a color shift between the two colors of the M and C images in formation of the images a, b on the dashed line 501a in FIG. 20.

In FIG. 10 (recording of an image on the first sheet of recording paper 63a), the reading optical system starts scanning the image of the original at the timing of the signal SCAN-START synchronized to the line synchronizing signal BD. The M-image signal and C-image signal read by this scanning operation are written at the address of the page memory 111 designated by the count value V-ADR in the sub-scan address counter 115, which is cleared by the signal ITOP and counts the line synchronizing signal BD, at the same time that they are recorded on the recording paper 63a affixed to the transfer drum 27.

Since the signal ITOPA and the line synchronizing signal BD are not synchronized, as shown in FIG. 10, the timing at which reading starts in the sub-scan direction develops a shift of a maximum of one line between the timing which prevails for the M image and that which prevails for the C image. On the other hand, since the position of the recording paper and the signal ITOPA naturally are in synchronization, the M image and the C image that have been recorded on the recording paper are displaced by an amount equivalent to the aforesaid shift in the reading-start timing (this shift is indicated at C1 in FIG. 10).

However, with regard to the image signal written in the page memory 111, the start of reading of the original (the timing of the signal SCAN-START) and the start of counting by the sub-scan address counter 115 (the timing of the line synchronizing signal BD) are such that the signal SCAN-START and the signal BD are in synchronism. As a consequence, regardless of whether the image is the M image or the C image, image signals at the same position in the sub-scan direction are stored at the same address of the page memory 111.

In FIG. 11 (recording of an image on the second sheet of recording paper 63a), the sub-scan address counter 115 is initialized by the signal ITOP, which is obtained by delaying the signal ITOPB by the time T. Thereafter, the counter 115 outputs the count value V-ADR, which is obtained by counting the line synchronizing signal BD. The image data MEM-DT is outputted by the page memory 111 in dependence upon the count value V-ADR. The M-image signal and C-image signal outputted by the page memory 111 are recorded on the recording paper 63b affixed to the transfer drum 27.

Since the signal ITOPB and the line synchronizing signal BD are not synchronized, as shown in FIG. 11, the timing at which read-out from the page memory 111 starts develops a shift of a maximum of one line between the timing which prevails for the M image and that which prevails for the C image. On the other hand, since the position of the recording paper and the signal ITOPB naturally are in synchronization, the M image and the C image that have been recorded on the recording paper are displaced by an amount equivalent to the aforesaid shift in the read-out start timing (this shift is indicated at C2 in FIG. 11).

However, as mentioned above, regardless of whether the image is the M image or the C image, image signals at the same position in the sub-scan direction are stored. As a result, even when the images are recorded based upon the image signals read out of the page memory 111, this does not cause a color shift to occur.

Thus, in the "two-sheet copying sequence" of this embodiment, the timing for start of sub-scan reading when the image data READ-DT is stored in the page memory 111 is synchronized to the signal BD which is counted by the sub-scan address counter 115. The counter 115 then outputs the address value of the page memory 111. As a result, a shift in multiple-image recording on the first sheet of recording paper 63a is equivalent to the disparity in reading-start timing at recording of each color. That is, the shift is equivalent to a maximum of one line. Further, a shift in multiple-image recording on the second sheet of recording paper 63b is equivalent to the disparity in start timing for read-out of the image data MEM-DT from the page memory 111. That is, the shift is equivalent to a maximum of one line.

Single-Sheet Copying Sequence

Figure 12:
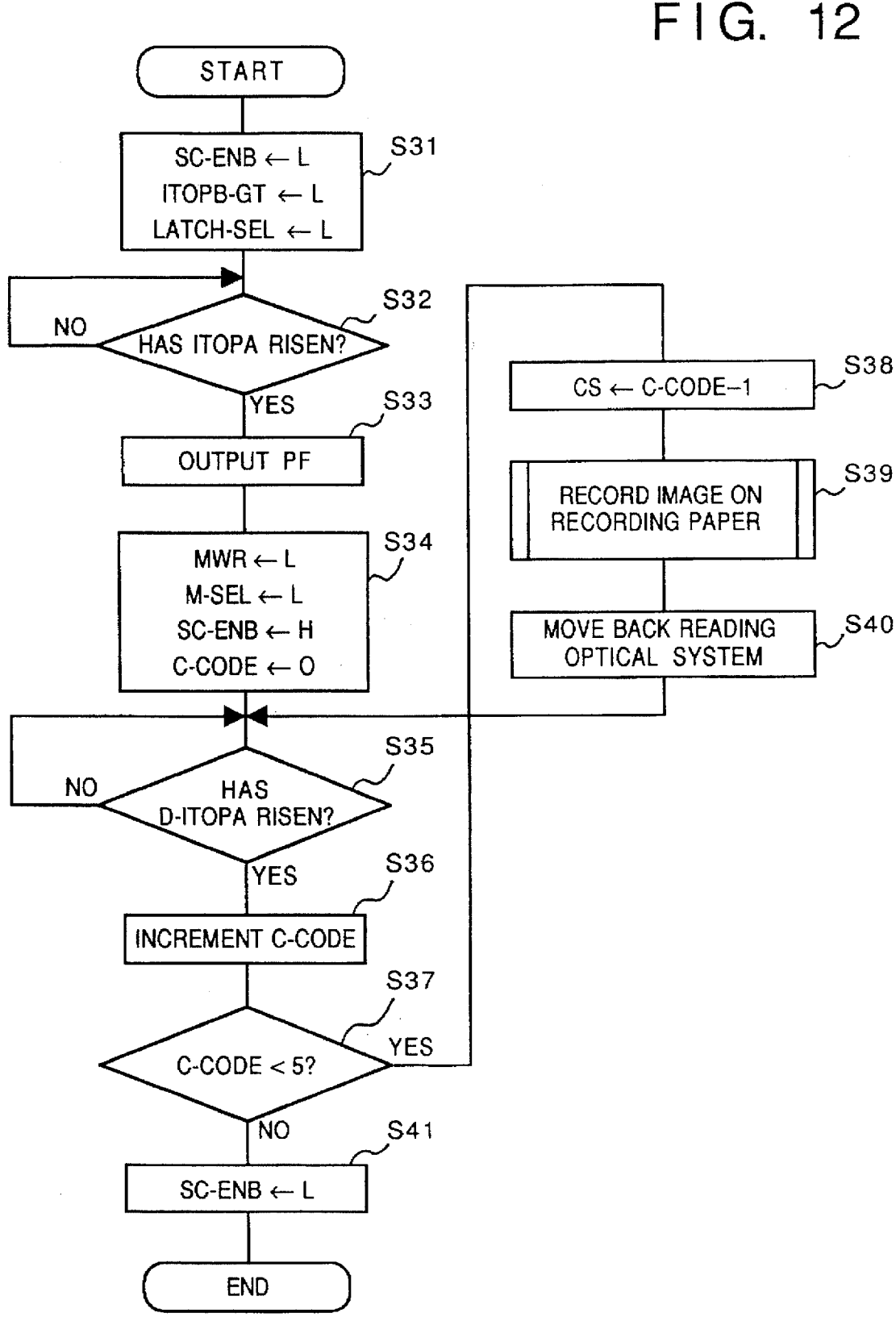
FIG. 12 is a flowchart illustrating a "single-sheet copying sequence" included in the flowchart of FIG. 7.

FIG. 12 is a flowchart illustrating the "single-sheet copying sequence".

As shown in FIG. 12, the CPU 116 executes step S31, at which the signal SC-ENB is made "L" to inhibit the signal SCAN-START, and the signal LATCH-SEL is made "L" to generate the signal SCAN-START at the timing of the signal L-ITOPA. Further, the CPU 116 lowers the signal ITOPB-GT to the "L" level to generate the signal ITOP solely from the signal ITOPA. In response to the signal ITOP produced whenever the transfer drum 27 makes one revolution, the CPU 116 supplies one sheet of recording paper 63 and records an image on this recording paper 63.

Next, at step S32, the CPU 116 waits for the signal ITOPA to rise. When this signal rises, the signal PF is outputted at step S33. Accordingly, the recording paper 63 is supplied.

Next, at step S34, the CPU 116 sends the signal MWR and the signal M-SEL to the "L" level, inverts the signal SC-ENB to the "H" level to enable the signal SCAN-START and sets the register C-CODE to 0.

The CPU 116 then waits for the signal D-ITOPA to rise at step S35. That is, the CPU 116 waits for the timing at which image recording starts on the recording paper 63 affixed to the transfer drum 27.

When the signal D-ITOPA rises, the AND gate 128 outputs the signal SCAN-START and the reading-motor controller 117 starts driving the reading motor 15. The CPU 116 increments the register C-CODE at step S36.

This is followed by step S37, at which it is determined, based upon the value in the register C-CODE, whether the recording of each of the four colors has ended. More specifically, the program proceeds to step S38 if C-CODE<5 holds (this indicates that there is an unrecorded color) and to step S41 if C-CODE=5 holds. At step S41, the signal SC-ENB is made "L" and processing is terminated.

If C-CODE<5 holds, then C-CODE-1 is outputted as the signal CS at step S38 and the selector 110 selects the color signal that conforms to the signal CS.

Next, at step S39, the reading motor 15 is driven by the reading-motor controller 117 to advance the reading optical system, and the image represented by the image data READ-DT is recorded on the recording paper 63.

When scanning of the original image ends, the reading motor 15 is driven by the reading-motor controller 117 at step S40 to retract the reading optical system so that the latter is returned to the reading starting position. The program then returns to step S35.

Figure 13:
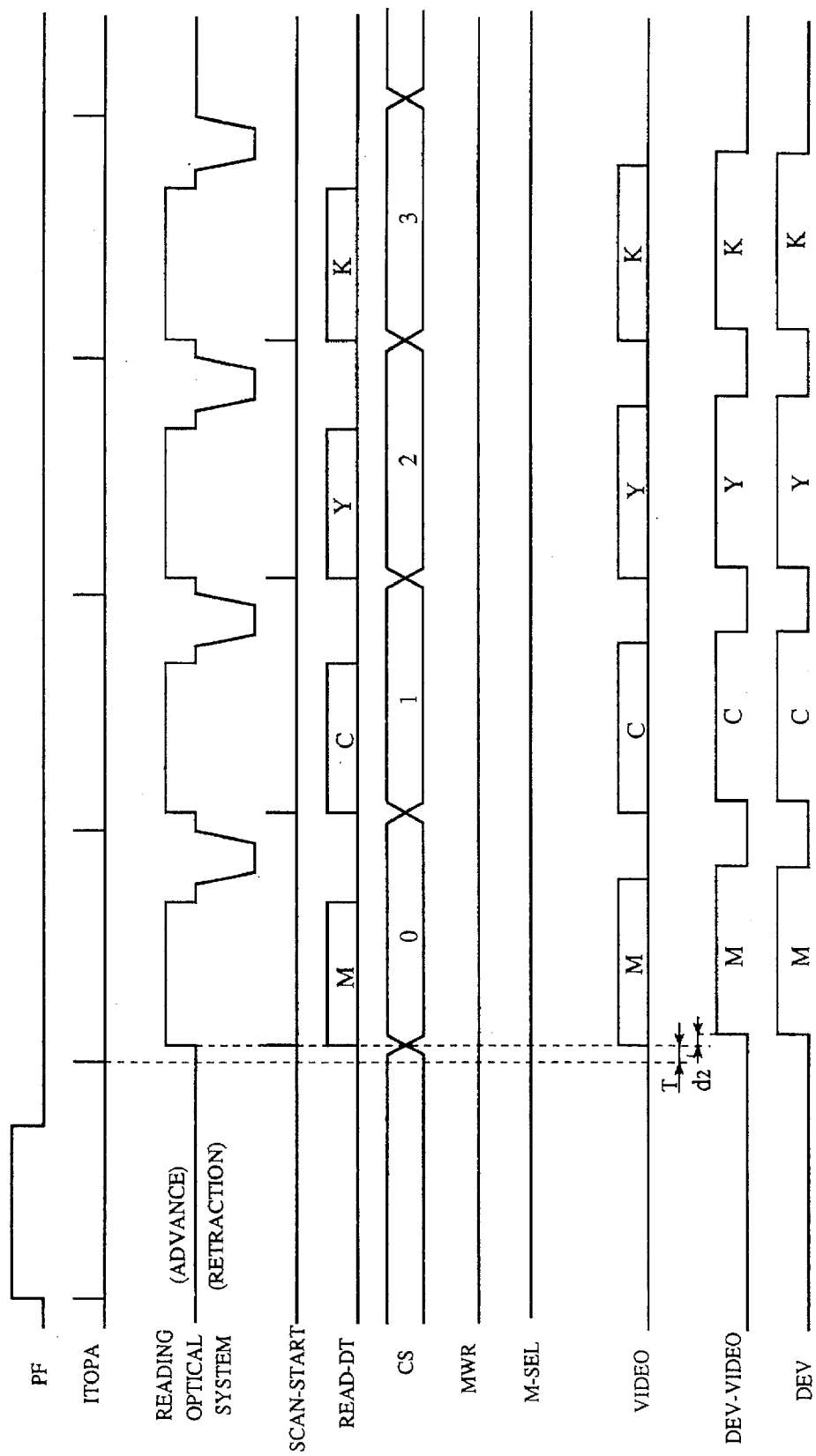
FIG. 13 is a timing chart of the "single-sheet copying sequence" according to this embodiment.

FIG. 13 is a timing chart of the "single-sheet copying sequence".

As shown in FIG. 13, the signal PF rises in conformity with the signal ITOPA and the recording paper 63 is fixedly attracted to the transfer drum 27.

Next, the signal D-ITOPA rises upon elapse of the time T from the rise of the signal ITOPA, whereupon the reading optical system is advanced to obtain an image signal of the original. At this time the signal CS is 0 and both the signal MWR and the signal M-SEL are "L". As a result, the M-image signal supplied as the image data READ-DT is selected by the selector 112 and outputted it as the image signal VIDEO. Accordingly, the M image represented by the image data READ-DT, obtained by real-time processing of the image signal read by the image sensing device 14, is recorded on the recording paper 63. When the scanning of the original by the reading optical system ends, the reading optical system is returned to the reading starting position.

As described in connection with FIG. 9, the signal DEV-VIDEO shown in FIG. 13 indicates the timing at which the electrostatic latent image formed on the photosensitive drum 19 reaches the developing position PS. In other words, the latent image formed at the latent-image forming position PL reaches the developing position PS after a time d2. The CPU 116 causes the latent image of each recording color to be developed using the developing device of the color indicated by DEV.

From this point onward, images are formed on the recording paper in the order of the C image, Y image and K image, after which the image recording operation is concluded.

In order to obtain a resolution of 400 dpi in both main and sub-scans according to this embodiment, a storage capacity of 14,960,000 pixels is required for letter size (279.4 mm in the main-scan direction and 216 mm in the sub-scan direction) and 15,460,000 pixels for size A4 (297 mm in the main-scan direction and 210 mm in the sub-scan direction). It is required that the page memory 111 having a storage capacity for at least size A4.

In the description and drawings mentioned thus far, an example is set forth in which whether or not the timing at which reading of the original starts is to be synchronized to the line synchronizing signal BD is selected based upon the size of the recording paper. However, this can be decided based upon the size of the original and the scanning magnification. For example, in a case where reduction ratio is set to 70% when the image of the original is size A3, i.e., in a case where an original image of size A3 is copied to recording paper of size A4, the read image signal can be stored in the page memory 111 having a storage capacity for size A4, and the above-described "two-sheet copying sequence" can be executed.

Further, in the description and drawings mentioned thus far, an example is set forth in which the delay device 130 is arranged in front of the selector 131. However, it is obvious that the delay device 130 may be placed in back of the selector 131.

Thus, in accordance with this embodiment as described above, if the recording paper is of small size, two sheets of the recording paper are fixedly attracted to the transfer drum, the image signal is stored in the page memory when the image is recorded on the first sheet of the recording paper, and the image signal is read out of the page memory to record the image on the second sheet of recording paper. The result is higher recording speed.

In this operation, reading is started in response to the signal L-ITOPA obtained by synchronizing the signal ITOPA, which serves as a reference for starting the reading of the original image, to the line synchronizing signal BD. A displacement in multiple-image recording on the first sheet of recording paper is no more than the displacement between the reading-start timing and the line synchronizing signal BD, i.e., no more than a maximum of one line. Furthermore, with regard to the image signal written in the page memory, the start of reading of the original image (the timing of the signal SCAN-START) and the start of counting by the sub-scan address counter 115 (the timing of the synchronizing signal BD) are such that the signal SCAN-START and the signal BD are in synchronism. As a consequence, regardless of the color of the image, image signals at the same position in the sub-scan direction are stored at the same address of the page memory 111. Accordingly, displacement in multiple-image recording on the second sheet of recording paper is no more than the disparity in the start timing at which the image data MEM-DT is read out of the page memory, i.e., no more than a maximum of one line.

Second Embodiment

A second embodiment of the invention will now be described, in which elements substantially the same as those of the first embodiment are designated by like reference characters and need not be described again.

Figure 14:
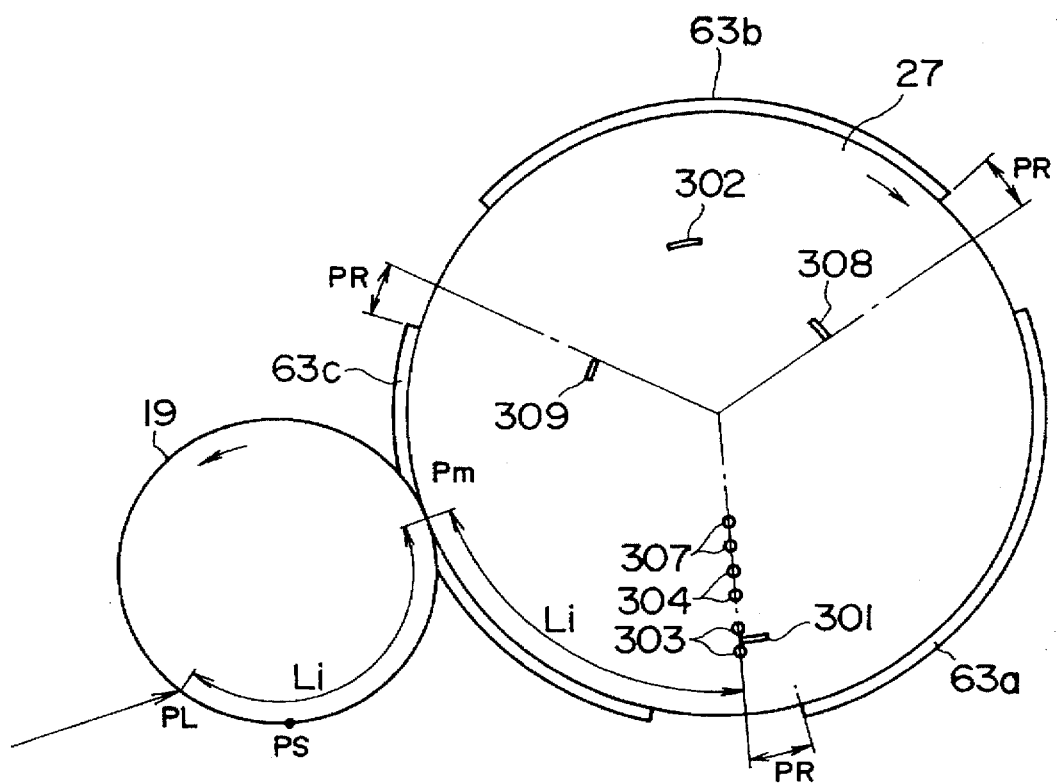
FIG. 14 is a diagram illustrating the relationship between the photosensitive drum and transfer drum of a full-color electrophotographic copier according to a second embodiment of the present invention.

FIG. 14 is a diagram illustrating the relationship between the photosensitive drum 19 and the transfer drum 27.

According to this embodiment, the color copier constructed as set forth in the first embodiment is so adapted that three sheets of small-size recording paper can be fixedly attracted to the transfer drum.

The diameter of the transfer drum 27 is 160 mm and the perimeter thereof 502.6 mm. In order to output a signal ITOPC for sensing the leading edges of the affixed second and third sheets of the recording paper, a photosensor 307 and two flag plates 308, 309 are added. The length of the recording paper for which three sheets can be fixedly attracted to the transfer drum 27 simultaneously is less than one-third of the perimeter of the transfer drum 27 (i.e., less than 167.5 mm). For example, if size A5 paper is fixedly attracted in the lengthwise (148.5 mm) direction thereof to the transfer drum 27 in the circumferential direction thereof, then three sheets of this paper can be affixed to the drum 27.

FIG. 14 illustrates a state in which three sheets of recording paper 63 of size A5 have been affixed to the transfer drum 27 equidistantly in the circumferential direction of the drum. The spacing between neighboring sheets of the recording paper is about 19 mm. Further, the flag plates 308, 309, which rotate together with the transfer drum 27, are disposed on the bottom side of the drum at identical radii at positions spaced a distance PR, along the circumference of the drum 27, from the leading edge of the second sheet of recording paper 63b and the leading edge of the third sheet of recording paper 63c, respectively.

Figure 15:
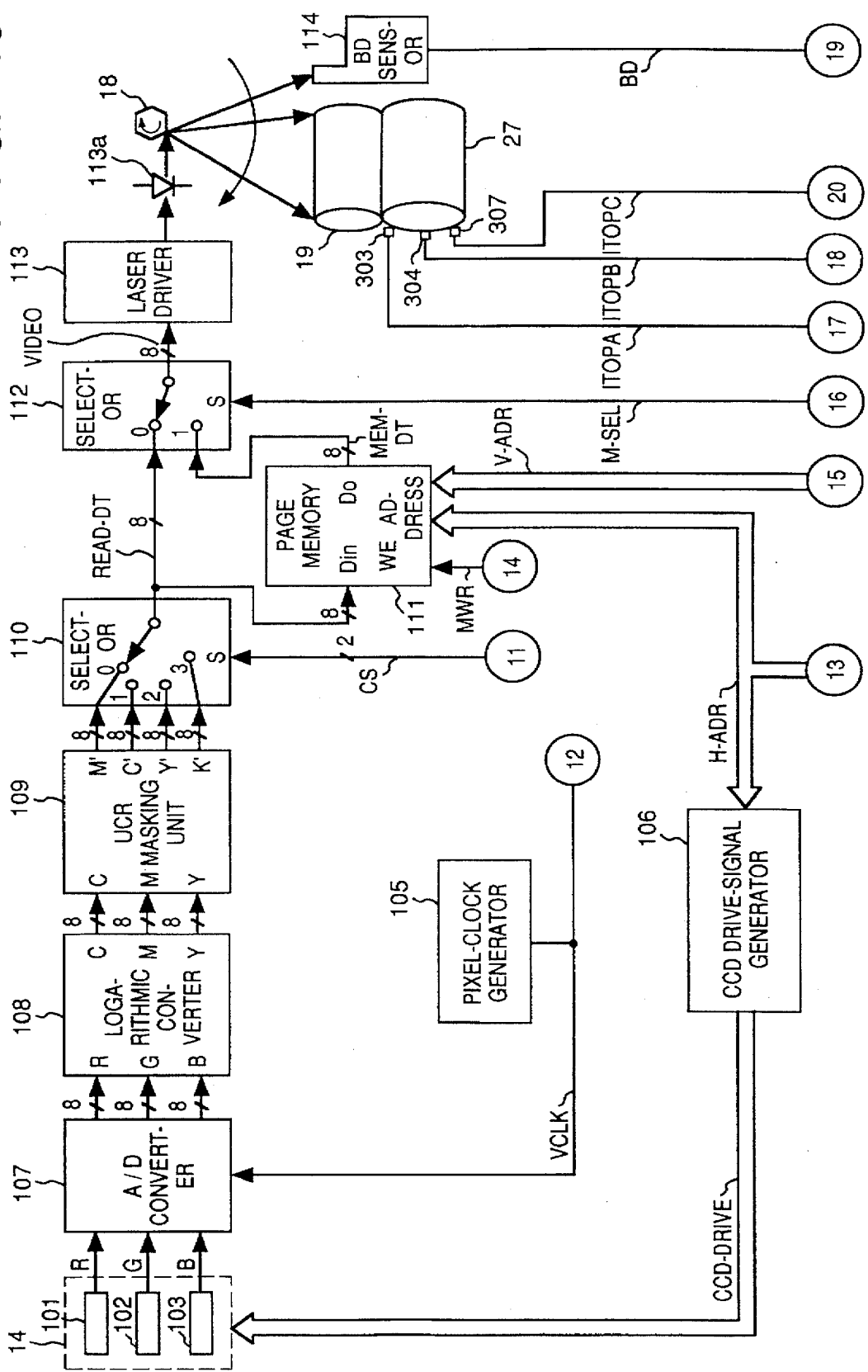
FIGS. 15 and 16 are block diagrams illustrating the construction of a controller and peripheral devices according to the second embodiment.
Figure 16:
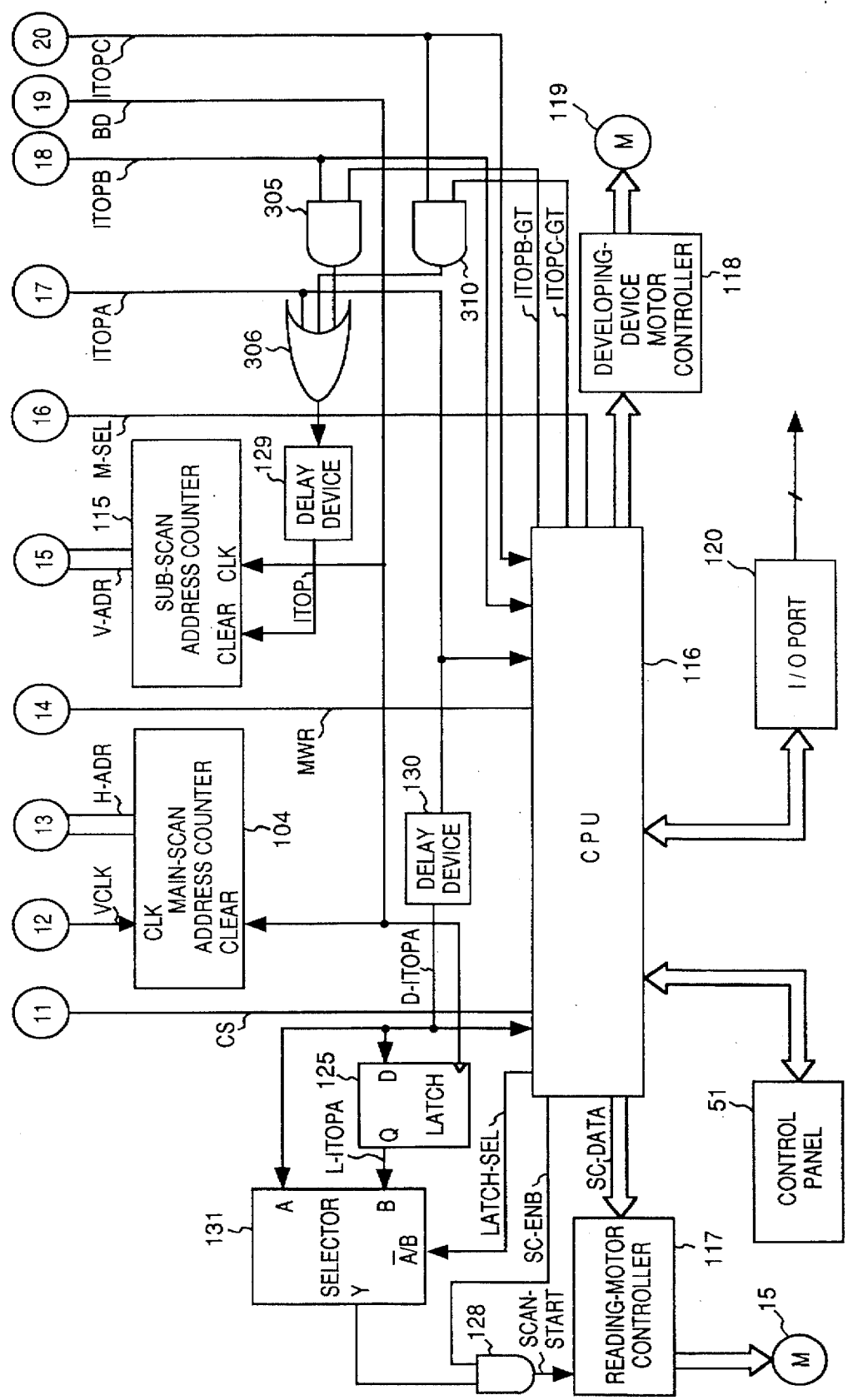

FIGS. 15 and 16 are block diagrams illustrating the construction of the controller 16 and peripheral devices according to this embodiment.

This embodiment differs from the first embodiment shown in FIGS. 2 and 3 in the addition of elements relating to the signal ITOPC from the photosensor 307 for sensing the leading edges of the second and third sheets of recording paper. More specifically, the signal ITOPC outputted by the photosensor 307 is applied to an AND gate 310, which takes the AND between this signal and a signal ITOPC-GT outputted from a port on the CPU 116. The OR gate 306 takes the OR between the signal ITOPA and the signal ITOPB or between the signal ITOPA and the signal ITOPC. Accordingly, the signal ITOP outputted by the delay device 129 is produced from the signal ITOPA, the signals ITOPA and ITOPB, or the signals ITOPA and ITOPC.

If the signal ITOPC-GT is made "L" in the arrangement of FIGS. 15 and 16, the "single-sheet copying sequence" and the "two-sheet copying sequence", described earlier in connection with the first embodiment, are realized.

A "three-sheet copying sequence", in which three sheets of the recording paper 63 are fixedly attracted to the transfer drum 27, will now be described.

Three-Sheet Copying Sequence

Figure 17:
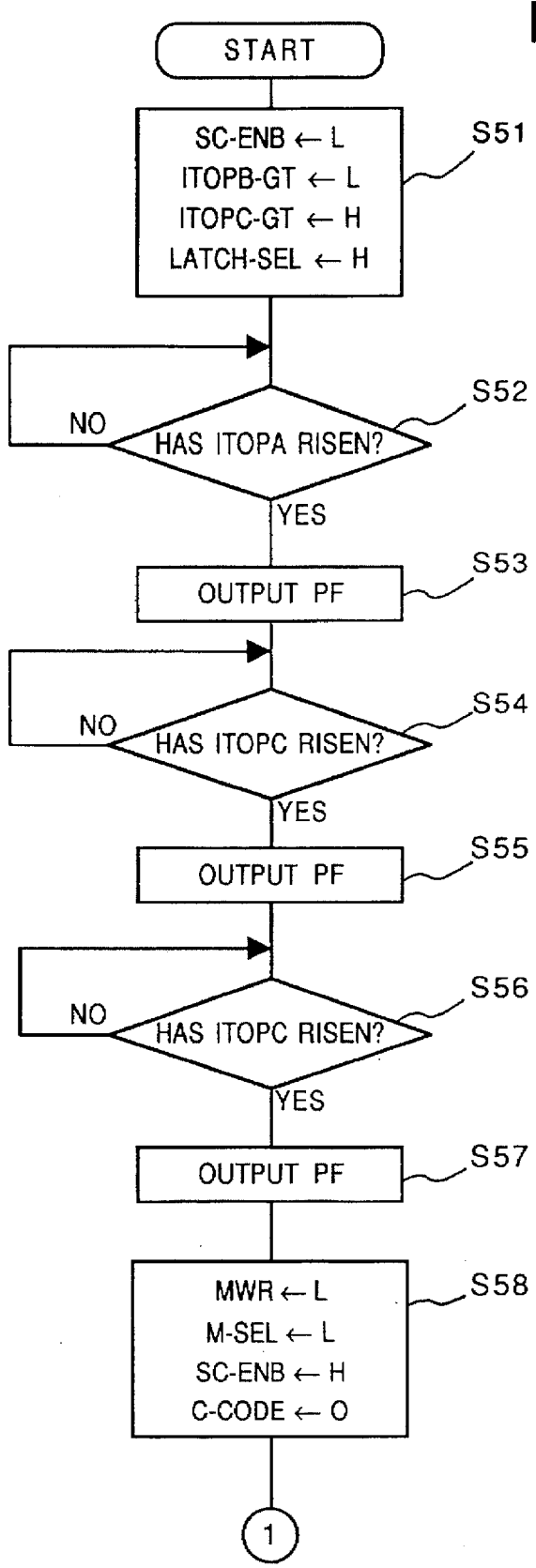
FIGS. 17 and 18 are flowcharts illustrating a "three-sheet copying sequence" according to the second embodiment.
Figure 18:
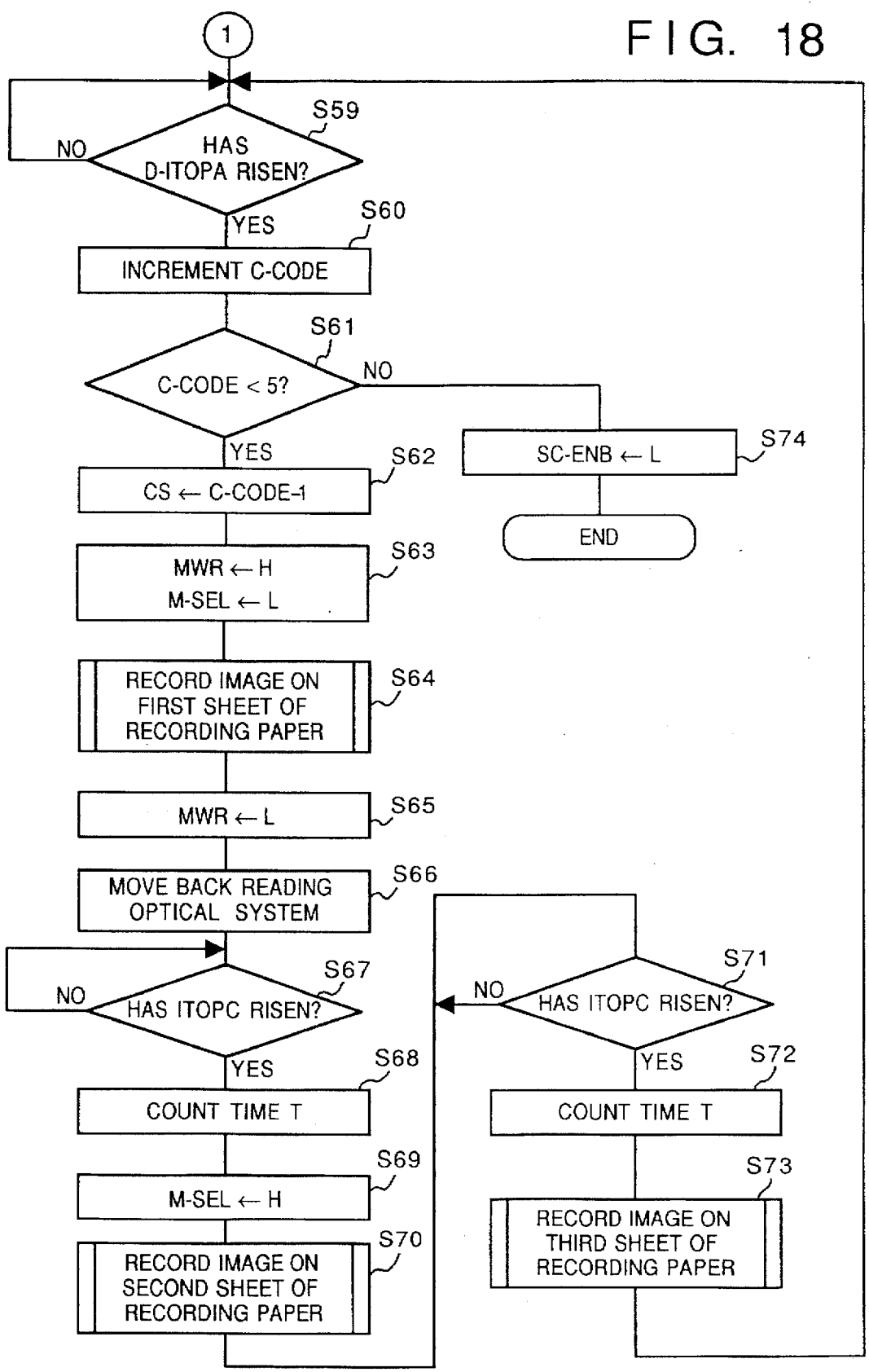

FIGS. 17 and 18 are flowcharts illustrating the "three-sheet copying sequence".

As shown in FIG. 17, the CPU 116 executes step S51, at which the signal SC-ENB is made "L" to inhibit the signal SCAN-START, and the signal LATCH-SEL is made "H" to generate the signal SCAN-START at the timing of the signal L-ITOPA. Further, the CPU 116 lowers the level of the signal ITOPB-GT to "L" and raises the signal ITOPC-GT to "H" to generate the signal ITOP from either the signal ITOPA or ITOPC.

Next, at step S52, the CPU 116 waits for the signal ITOPA to rise. When this signal rises, the signal PF is outputted at step S53. Accordingly, the first sheet of recording paper 63a is supplied.

Next, at step S54, the CPU 116 waits for the signal ITOPC to rise. When this signal rises, the signal PF is outputted at step S55. Then, at step S56, the CPU 116 waits for the signal ITOPC to rise again. When this signal rises, the signal PF is outputted at step S57. Accordingly, the second and third sheets of recording paper 63b, 63c, respectively, are supplied one after the other.

Next, at step S58, the CPU 116 sends the signal MWR and the signal M-SEL to the "L" level, inverts the signal SC-ENB to the "H" level to enable the signal SCAN-START and sets a register C-CODE, which is provided in an internal memory (not shown), to 0.

The CPU 116 then waits for the signal D-ITOPA to rise at step S59. That is, the CPU 116 waits for the timing at which image recording starts on the first sheet of recording paper 63a affixed to the transfer drum 27.

When the signal D-ITOPA rises and the signal L-ITOPA rises in synch with the line synchronizing signal BD, the AND gate 128 outputs the signal SCAN-START and the reading-motor controller 117 starts driving the reading motor 15. The CPU 116 increments the register C-CODE at step S60.

This is followed by step S61, at which it is determined, based upon the value in the register C-CODE, whether the recording of each of the four colors has ended. More specifically, the program proceeds to step S62 if C-CODE<5 holds (this indicates that there is an unrecorded color) and to step S74 if C-CODE=5 holds. At step S74, the signal SC-ENB is made "L" and processing is terminated.

If C-CODE<5 holds, then C-CODE-1 is outputted as the signal CS at step S62 and the selector 110 selects the color signal that conforms to the signal CS.

The signal MWR is made "H" and the signal M-SEL is made "L" at step S63. Then, at step S64, the reading motor 15 is driven by the reading-motor controller 117 to advance the reading optical system, image data READ-DT is stored in the page memory 111 and an image represented by the image data READ-DT is recorded on the first sheet of recording paper 63a.

When scanning of the original image ends, the signal MWT is made "L" at step S65 to end the writing of the page memory 111. Then, at step S66, the reading motor 15 is driven by the reading-motor controller 117 to retract the reading optical system so that the latter is returned to the reading starting position.

Next, at step S67, the CPU 116 waits for the signal ITOPC to rise. When this signal rises, the time T is counted at step S68, after which the signal M-SEL is made "H" at step S69. Then, at step S70, the image data MEM-DT that has been stored in the page memory 111 is read out and the image is recorded on the second sheet of recording paper 63b.

Next, at step S71, the CPU 116 waits for the signal ITOPC to rise again. When this signal rises, the time T is counted at step S72, after which the image data MEM-DT that has been stored in the page memory 111 is read out and the image is recorded on the third sheet of recording paper 63c, at which the program returns to step S59.

Thus, in the "three-sheet copying sequence", three sheets of recording paper of, say, size A5, are fixedly attracted to the transfer drum 27, and recording of an image on the first sheet 63a is performed by an image signal obtained by driving the reading optical system at the timing of the signal L-ITOPA. The recording of the images on the second and third sheets 63b, 63c is performed by reading the image signal, used in recording the image on the first sheet, out of the page memory 111. It should be noted that the reading optical system is returned to the reading starting position during the recording of the image on the second and third sheets.

Furthermore, if the flag plates of the transfer drum 27 and the photosensors are increased in number, a copying sequence can be realized in which four or more sheets of recording paper can be affixed to the transfer drum simultaneously. The shift in multiple-image recording in this embodiment is the same as that described in the first embodiment.

Thus, in accordance with the second embodiment as described above, high-speed recording can be achieved in a "three-sheet copying sequence", in which the color shift is no more than a maximum of one line, just as in the first embodiment.

Third Embodiment

A third embodiment of the invention will now be described, in which elements substantially the same as those of the first embodiment are designated by like reference characters and need not be described again.

In the first and second embodiments, an example is described in which the present invention is applied to a color copier that employs a transfer drum. However, the invention is not limited to such an arrangement but can be applied also to a color copier that relies upon a superimposed-color developing method, namely a method in which M, C, Y and K toners are successively superimposed on a large-diameter photosensitive drum form color images, which are then transferred collectively to recording paper.

Figure 19:
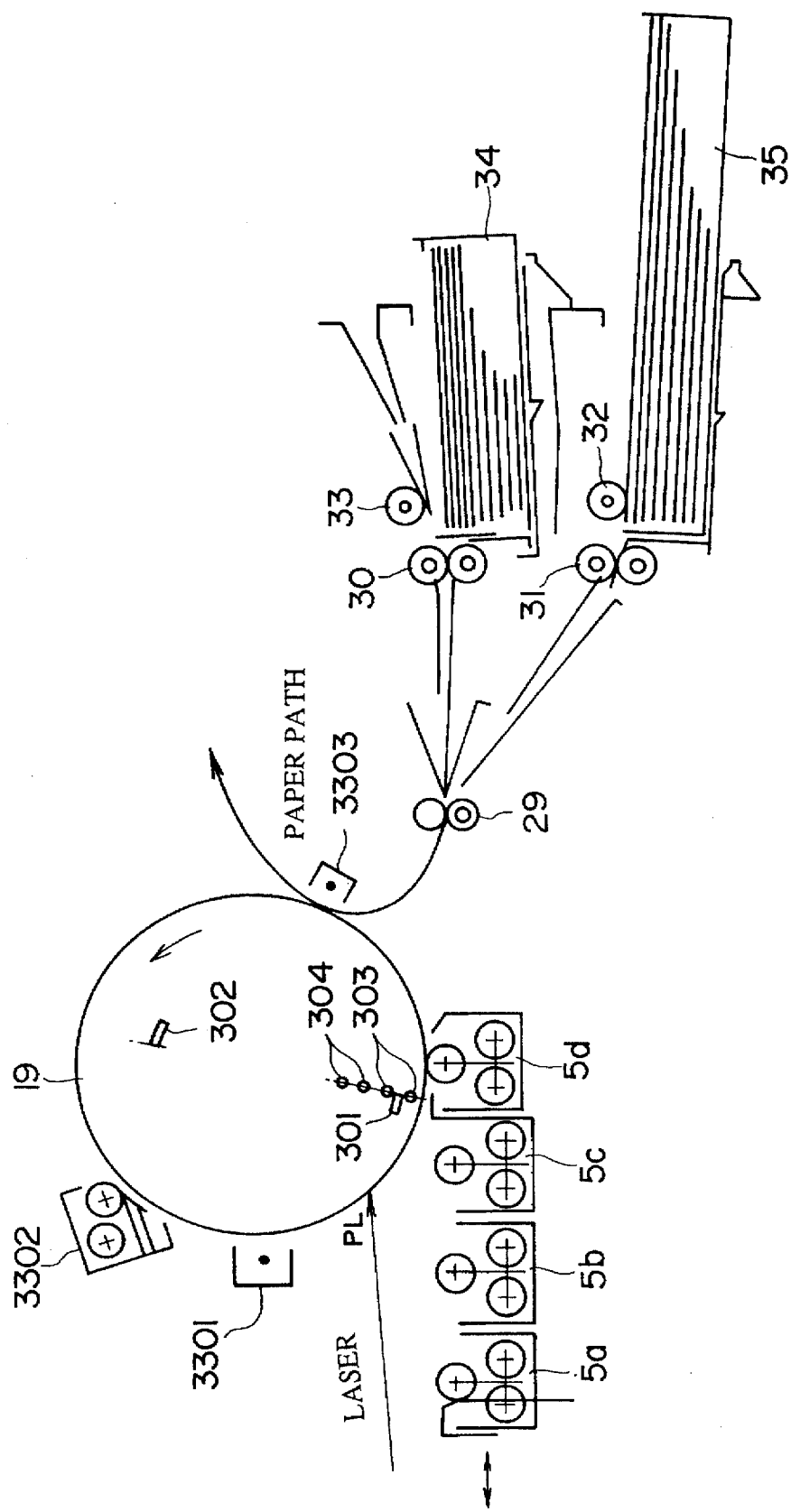
FIG. 19 is a diagram illustrating the construction of a color copier which employs a superimposed-color developing method according to a third embodiment of the present invention.

FIG. 19 is a diagram illustrating the construction of a color copier which employs a superimposed-color developing method according to a third embodiment of the present invention. Here the photosensitive drum 19 has a diameter identical with that of the transfer drum 27 in the first embodiment so that color images for two sheets of recording paper of size A4 can be formed on the drum 19.

In FIG. 19, numeral 3301 denotes a primary corona discharge device, 3302 a detachable cleaner and 3303 a transfer corona discharge device.

The flag plates 301, 302, which are attached to the photosensitive drum 19 at positions symmetrical with respect to the rotational axis of the drum 19, rotate together with the photosensitive drum 19. The photosensors 303, 304 output the signals ITOPA, ITOPA when the flag plates 301, 302, respectively, are sensed.

When the signal ITOPA enters from the photosensor 303 in this embodiment, the reading optical system is driven to read the original and obtain an image signal, in the same manner as described in the first embodiment, on the basis of which a latent image for the first sheet of recording paper is formed on the photosensitive drum 19 from a position thereof corresponding to the flag plate 301. The resulting image signal is also stored in the page memory 111. The latent image that has been formed on the photosensitive drum 19 is developed by the magenta developing device 5d. Next, when the signal ITOPB enters from the photosensor 304, the image signal that has been stored in the page memory 111 is read out, a latent image for the second sheet of recording paper is formed on the photosensitive drum 19 from a position thereof corresponding to the flag plate 302, and this image is developed. The reading optical system is then returned to the reading starting position.

From this point onward, according to this embodiment, the foregoing operation is repeated in the order of the colors C, Y and K to form color images, for two sheets of recording paper, on the photosensitive drum 19. During this time the cleaner 3302 is at a location spaced away from the surface of the photosensitive drum 19.

When formation of the color images is concluded, in this embodiment two sheets of the recording paper are supplied from the paper cassette 35 one after the other in synch with the signals ITOPA, ITOPB, and the color images of two sheets that have been formed on the photosensitive drum 19 are transferred to the separate sheets of recording paper by the transfer corona discharge device 3303.

Thus, as should be obvious from the foregoing description, this embodiment is so adapted that the photosensitive drum 19 is furnished with the functions of both the transfer drum 27 and photosensitive drum 19 of the first embodiment.

As in the first embodiment, at the recording of the image for the first sheet of recording paper, the reading operation of the reading optical system is started and recording of the image is carried out using a reference which is the signal L-ITOPA obtained by synchronizing the signal ITOPA to the line synchronizing signal BD. At the same time, recording of the image in the page memory 111 is performed in synchronization with the line synchronizing signal BD. At recording of the image for the second sheet, the image signal that has been stored in the page memory 111 is read out and the image recorded in synchronization with the line synchronizing signal BD. Accordingly, the shift in multiple-image recording in this embodiment is similar to that of the first embodiment.

Further, in this embodiment, a copying sequence in which three or more sheets of recording paper are affixed to the transfer drum simultaneously can be achieved by providing four or more flag plates that co-rotate with the photosensitive drum 19, and three or more corresponding photosensors.

Thus, in accordance with the third embodiment as described above, high-speed recording can be achieved, and the color shift can be held to no more than one line, as in the first and second embodiments, in a color copier that relies upon the superimposed-color developing method.

Modification

In each of the foregoing embodiments, an example is described in which a delay of time T is obtained via the delay devices 129, 130 after the signals ITOPA, ITOPB, ITOPC are generated. As set forth above, the reason for this is that the position of the leading edge of the recording paper 63 on the transfer drum 27 is shifted by the arc length PR with respect to the arc length Li from the position PL at which the latent image is formed to the transfer position Pm. As a consequence, the time required for the transfer drum 27 to rotate by the length PR of the arc is T. This means that if PR=0 holds, the delay devices 129, 130 will no longer be required.

Further, in order to produce the synchronizing signals for recording images on a plurality of sheets of recording paper, use is made of a plurality of flag plates that co-rotate with the transfer drum 27 or photosensitive drum 19, and of a plurality of photosensors secured to the housing of the transfer unit 4. However, these may be any means capable of sensing that the transfer drum 27 has rotated to a predetermined position; the flag plates and photosensors do not impose a limitation on the invention. For example, by using a timer counter instead of flag plates, a synchronizing signal may be generated in pseudo-fashion by counting, on a real-time basis, a time that corresponds to the distance between flag plates.

The image recording apparatus to which the present invention is applied may be one which uses an intermediate transfer body instead of a transfer drum.

The present invention is applicable not only to the memory retention operation described above, namely the operation in which a read image signal is stored in memory at the same time that the image represented by this image signal is recorded, with use being made of this image signal, read out of the memory, in image recording from the second sheet of recording paper onward. Specifically, the invention is applicable also to a case in which image recording is performed by reading an image signal stored in memory temporarily in order to adjust a difference in speed between reading speed and recording speed.

Furthermore, in each of the foregoing embodiments, an example is described in which the reading operation for the "single-sheet copying sequence" is started at the timing at which the signal ITOPA rises. However, it may be so arranged that the rise in the signal L-ITOPA is made the start of the reading operation in the "single-sheet copying sequence" as well. If this expedient is adopted, the selector 131 and the signal LATCH-SEL may be eliminated.

As many apparently widely different embodiments of the present invention can be made without departing from the spirit and scope thereof, it is to be understood that the invention is not limited to the specific embodiments thereof except as defined in the appended claims.

What is claimed is:

1. An image recording method in an apparatus having recording means for recording an image by superimposing images of different colors, comprising:

a reading step of starting reading of an image based upon a first timing signal, produced by said recording means, representing a recording-medium retention position;

a processing step of processing an image signal, which has been obtained at said reading step, for obtaining an image signal of a prescribed color;

a first recording step of storing the image signal, which has been obtained at said processing step, in memory means in synchronization with a synchronizing signal produced by said recording means, and recording this image signal of a first recording medium; and a second recording step of recording the image signal, which has been read out of said memory means in synchronization with the synchronizing signal, on a recording medium from a second recording medium onward.

2. The method according to claim 1, wherein said reading step starts reading of the image in response to a second timing signal obtained as a result of synchronizing the first timing signal to the synchronizing signal.

3. The method according to claim 1, wherein said reading step includes the steps of:

starting reading of the image based upon the first timing signal in a case where said recording means retains the first recording medium; and starting reading of the image in response to a second timing signal, which is obtained as a result of synchronizing the first timing signal relating to the first recording medium to the synchronizing signal, in a case where said recording means retains the recording medium from the second recording medium onward.

4. The method according to claim 1, wherein said processing step processes the image signal, which has been obtained at said reading step, for outputting an image signal in any of colors cyan, magenta, yellow and black.

5. The method according to claim 1, wherein storage and read-out addresses of said memory means are initialized based upon the first timing signal.

6. The method according to claim 4, wherein said first recording step and said second recording step record image signals of colors cyan, magenta, yellow and black in superimposed form on the first recording medium.

7. The method according to claim 1, wherein said first recording step starts storage of the image signal in said memory means based upon the first timing signal relating to the first recording medium.

8. The method according to claim 1, wherein said second recording step starts read-out of the image signal from said memory means based upon the first timing signal relating to the recording medium from the second recording medium onward.

9. An image recording apparatus for recording an image by superimposing images of different colors, comprising:

reading means for reading an image;

processing means for processing an image signal, which has entered from said reading means, for obtaining an image signal of a prescribed color;

memory means for storing the image signal, which has entered from said processing means, in synchronization with a synchronizing signal, and outputting this stored image signal in synchronization with the synchronizing signal; and recording means for retaining at least one recording medium, recording the image signal, which has entered from said processing means, on a first recording medium, and recording the image signal, which has entered from said memory means, on a recording medium from a second recording medium onward.

10. The apparatus according to claim 9, wherein said processing means processes the image signal, which has entered from said reading means, for outputting an image signal in any of colors cyan, magenta, yellow and black.

11. The apparatus according to claim 10, wherein said recording means records successively entered image signals of colors cyan, magenta, yellow and black in superimposed form on one recording medium.

12. The apparatus according to claim 9, wherein said recording means produces the synchronizing signal, which is a line synchronizing signal, and a plurality of first timing signals representing retention position of said recording medium.

13. The apparatus according to claim 12, wherein a storage starting address and an output starting address of said memory means are initialized based upon the first timing signal.

14. The apparatus according to claim 12, wherein a storage starting address and an output starting address of said memory means are initialized in response to a second timing signal obtained by applying a prescribed time delay to the first timing signal.

15. The apparatus according to claim 14, wherein the second timing signal represents timing required for a leading edge of said recording medium to arrive at a recording position of said recording means.

16. The apparatus according to claim 13, wherein said memory means starts storage of the image signal based upon the first timing signal relating to the first storage medium.

17. The apparatus according to claim 13, wherein said memory means starts storage of the image signal at a timing obtained by applying a prescribed time delay to the first timing signal relating to the first storage medium.

18. The apparatus according to claim 13, wherein said memory means starts output of the stored image signal based upon the first timing signal relating to the storage medium from the second storage medium onward.

19. The apparatus according to claim 13, wherein said memory means starts output of the stored image signal at a timing obtained by applying a prescribed time delay to the first timing signal relating to the storage medium from the second storage medium onward.

20. The apparatus according to claim 12, wherein said reading means starts reading of the image in response to a third timing signal obtained as a result of synchronizing the first timing signal to the synchronizing signal.

21. The apparatus according to claim 12, wherein said reading means starts reading of the image in response to a third timing signal obtained as a result of synchronizing a fourth timing signal, which is obtained by applying a prescribed time delay to the first timing signal, to the synchronizing signal.

22. The apparatus according to claim 21, wherein the fourth timing signal represents a timing required for a leading edge of the recording medium to arrive at a recording position of said recording means.

23. The apparatus according to claim 12, wherein said reading means starts reading of the image based upon the first timing signal in a case where said recording means retains one recording medium, and starts-reading of the image in response to a third timing signal, which is obtained as a result of synchronizing the first timing signal relating to the first recording medium to the synchronizing signal, in a case where said recording means retains two or more recording media.

24. The apparatus according to claim 12, wherein said reading means starts reading of the image based in response to a fourth timing signal, which is obtained by applying a prescribed time delay to the first timing signal, in a case where said recording means retains one recording medium, and starts reading of the image in response to a third timing signal, which is obtained as a result of synchronizing the fourth timing signal relating to the first recording medium to the synchronizing signal, in a case where said recording means retains two or more recording media.

25. The apparatus according to claim 24, wherein the fourth timing signal represents a timing required for a leading edge of the recording medium to arrive at a recording position of said recording means.

26. An image recording method in an apparatus having recording means for recording an image by superimposing images of different colors, comprising:

a reading step of starting reading of an image based upon a first timing signal, produced by said recording means, representing a recording-medium retention position;

a processing step of processing an image signal, which has been obtained at said reading step, for obtaining an image signal of a prescribed color;

a first recording step of storing the image signal, which has been obtained at said processing step, in memory means in synchronization with a synchronizing signal produced by said recording means, and recording this image signal on a first recording medium; and a second recording step of recording the image signal, which has been read out of said memory means in synchronization with the synchronizing signal, as an image of a second image onward; and a transfer step of transferring the image recorded at said first recording step and at least one image recorded at said second recording step to respective ones of different recording media.

27. An image recording apparatus for recording an image by superimposing images of different colors, comprising:

reading means for reading an image;

processing means for processing an image signal, which has entered from said reading means, for obtaining an image signal of a prescribed color;

memory means for storing the image signal, which has entered from said processing means, in synchronization with a synchronizing signal, and outputting this stored image signal in synchronization with the synchronizing signal; and recording means for recording the image signal, which has entered from said processing means, as a first image, recording the image signal, which has entered from said memory means, as an image of a second image onward, and then transferring at least two stored images to respective ones of different recording media.

28. An image recording apparatus comprising:

input means for entering an image signal;

memory means for storing the entered image signal; and output means for outputting the image signal to recording means having a drum-shaped body for retaining a plurality of recording media;

wherein after an output operation of the entered image signal for recording the entered image signal on one recording medium retained on said drum-shaped body and an operation for storing the entered image signal in said memory means have been performed in parallel, the image signal read out of said memory means is outputted to said recording means in order to record the image signal on another recording medium retained on said drum-shaped body.

29. A copying apparatus comprising:

driving means for driving an optical device which is used to read an image of an original, to move relative to the original to scan the original;

recording means for recording an image on a recording medium on a line-by-line basis, and for generating a line synchronizing signal; and controlling means for controlling the driving means to effect relative motion of the optical device;

wherein said controlling means comprises means for controlling the driving means to start the relative motion of the optical device in synchronism with the line synchronizing signal.

30. The apparatus according to claim 29, further comprising memory means for storing image data obtained by scanning the original.

31. The apparatus according to claim 30, wherein said apparatus has a first mode in which the image data is stored in said memory means and a second mode in which the image data is not stored in said memory means when an image is recorded by said recording means; and wherein said controlling means controls the driving means to start relative motion of the optical device in synchronism with the line synchronizing signal when said apparatus is operational in the first mode.

32. The apparatus according to claim 31, wherein in the first mode, storing the image data in said memory means and recording the image via said recording means are performed simultaneously.

33. The apparatus according to claim 29, wherein said apparatus is capable of copying a color original.

34. The apparatus according to claim 33, wherein said controlling means controls the driving means to drive the optical device to scan the original a plurality of times in order to obtain plural images corresponding to each of plural color components; and wherein said recording means records the plural images sequentially.

35. The apparatus according to claim 34, wherein said recording means superimposes the plural images on a drum-shaped image holding means or on a recording medium retained on a drum-shaped body.

36. The apparatus according to claim 35, further comprising memory means for storing image data obtained by scanning the original;

wherein said apparatus has a first mode in which the image data is stored in said memory means when an image is recorded by said recording means and a second mode in which the image data is not stored in said memory means when the image is recorded by said recording means; and wherein, when plural copies of one original are formed, a first copy of the plural copies is made when said apparatus is in the first mode.

37. The apparatus according to claim 36, wherein said apparatus is capable of forming a plurality of images of one original on said drum-shaped image holding means or on a plurality of recording media retained on said drum-shaped body.

38. The apparatus according to claim 36, further comprising:

detecting means for detecting rotational positions of said drum-shaped image holding means or of said drum-shaped body;

synchronizing means for synchronizing an output of said detecting means with the line synchronizing signal; and selecting means for selecting either the output of said detecting means or an output of said synchronizing means and for using a selected output as a signal for starting operation of said driving means;

wherein said selecting means selects the output of said synchronizing means when said apparatus is in the first mode, and selects the output of said detecting means when said apparatus is in the second mode.

39. The apparatus according to claim 29, wherein said recording means comprises:

deflection means for deflecting a beam modulated in accordance with image data; and detecting means for detecting a deflected beam in a prescribed position, and for generating the line synchronizing signal based on a detection result.

40. A copying apparatus comprising:

driving means for driving an optical device to move relative to an original to scan the original;

recording means for recording an image of the original on a recording medium; and controlling means for controlling the driving means to effect relative motion of the optical device;

wherein said controlling means has a first mode in which the driving means starts the relative motion of the optical device in synchronism with a line synchronizing signal and a second mode in which the driving means starts the relative motion of the optical device asynchronously with respect to the line synchronizing signal.

41. The apparatus according to claim 40, further comprising memory means for storing image data obtained by scanning the original;

wherein in a case where an image is recorded by said recording means, said apparatus uses said memory means in the first mode and does not use said memory means in the second mode.

42. The apparatus according to claim 40, wherein in the first mode, storing the image data in said memory means and recording the image via said recording means are performed simultaneously.

43. The apparatus according to claim 40, wherein said apparatus is capable of copying a color original.

44. The apparatus according to claim 43, wherein said controlling means controls the driving means so that the optical device scans an original a plurality of times in order to obtain plural images corresponding to each of plural color components; and wherein said recording means records the plural images sequentially.

45. The apparatus according to claim 44, wherein said recording means superimposes the plural images on a drum-shaped image holding means or on a recording medium retained on a drum-shaped body.

46. The apparatus according to claim 45, further comprising memory means for storing image data obtained by scanning the original;

wherein said apparatus has a first mode in which the image data is stored in said memory means when an image is recorded by said recording means and a second mode in which the image data is not stored in said memory means when the image is recorded by said recording means; and wherein, when forming plural copies of one original, a first copy of the plural copies is formed when said apparatus is in the first mode.

47. The apparatus according to claim 46, wherein said apparatus is capable of forming a plurality of images of one original on said image holding means or on a plurality of recording media retained on said drum-shaped body.

48. The apparatus according to claim 45, further comprising:

detecting means for detecting rotational positions of said drum-shaped image holding means or said drum-shaped body;

synchronizing means for synchronizing an output of said detecting means with the line synchronizing signal; and selecting means for selecting either the output of said detecting means or an output of said synchronizing means, and for using a selected output as a signal to start said driving means;

wherein said selecting means selects the output of said synchronizing means when said apparatus is in the first mode, and selects the output of said detecting means when said apparatus is in the second mode.

49. The apparatus according to claim 40, wherein said recording means comprises:

deflection means for deflecting a beam modulated in accordance with image data; and detecting means for detecting a deflected beam in a prescribed position, and for generating the line synchronizing signal based on a detection result.

50. An apparatus for supplying image data, obtained by scanning an original, to a recording means which records images on a recording medium on a line-by-line basis and which generates a line synchronizing signal, said apparatus comprising:

driving means for driving an optical device which is used to read an image of an original, to move relative to the original to scan the original; and controlling means for controlling the driving means to effect relative motion of the optical device;

wherein said controlling means comprises means for controlling the driving means to start the relative motion of the optical device in synchronism with the line synchronizing signal.

51. The apparatus according to claim 50, further comprising memory means for storing the image data obtained by scanning the original.

52. The apparatus according to claim 51, wherein said apparatus has a first mode in which the image data is stored in said memory means prior to being applied to said recording means and a second mode in which the image data is not stored in said memory means prior to being supplied to said recording means; and wherein, when said apparatus is in the first mode, said controlling means controls said driving means so that the relative motion of the optical device is in synchronism with the line synchronizing signal.

53. The apparatus according to claim 52, wherein in the first mode, storing the image data in said memory means and supplying the image data to said recording means are performed simultaneously.

54. The apparatus according to claim 50, wherein said apparatus is capable of supplying color image data.

55. The apparatus according to claim 54, wherein said controlling means controls the driving means so that the optical device scans the original a plurality of times in order to obtain plural images corresponding to each of plural color components.

56. The apparatus according to claim 53, wherein in a case where image data of one original is repeatedly supplied, said apparatus first supplies image data in the first mode.

57. An apparatus for supplying image data to a recording means which records an image of an original on a recording medium, said apparatus comprising:

driving means for driving an optical device to move relative to the original in order to scan the original; and controlling means for controlling the driving means to effect relative motion of the optical device;

wherein said controlling means has a first mode in which the driving means starts the relative motion of the optical device in synchronism with a line synchronizing signal and a second mode in which the driving means starts the relative motion of the optical device asynchronously with respect to the line synchronizing signal.

58. The apparatus according to claim 57, further comprising memory means for storing image data obtained by scanning the original;

wherein, in a case where the image is recorded by said recording means, said apparatus uses said memory means in the first mode and does not use said memory means in the second mode.

59. The apparatus according to claim 58, wherein in the first mode, storing the image data in said memory means and supplying the image data to said recording means are performed simultaneously.

60. The apparatus according to claim 57, wherein said apparatus is capable of supplying color image data.

61. The apparatus according to claim 60, wherein said controlling means controls the driving means so that the optical device scans the original a plurality of times in order to obtain plural images corresponding to each of plural color components.

62. The apparatus according to claim 59, wherein in a case where image data of one original is repeatedly supplied, said apparatus first supplies image data in the first mode.

63. An image forming apparatus comprising:

inputting means for inputting image data from a data source;

first generating means for generating a line synchronizing signal;

second generating means for generating a frame synchronizing signal which is asynchronous with respect to the line synchronizing signal;

synchronizing means for synchronizing the frame synchronizing signal with the line synchronizing signal; and outputting means for selectively outputting to the data source, either (1) the frame synchronizing signal generated by said second generating means, or (2) the frame synchronizing signal synchronized by said synchronizing means.

64. The apparatus according to claim 63, wherein said apparatus superimposes images corresponding to each of plural color components on a drum-shaped image holding means or on a recording medium retained on a drum-shaped body.

65. The apparatus according to claim 64, wherein said apparatus is capable of forming a plurality of images of one original on said drum-shaped image holding means or on a plurality of recording media retained on said drum-shaped body.

66. The apparatus according to claim 64, wherein said second generating means comprises detecting means for detecting rotational positions of said drum-shaped image holding mean or of said drum-shaped body.

67. The apparatus according to claim 63, further comprising:

deflection means for deflecting a beam modulated in accordance with image data; and detecting means for detecting a deflected beam in a prescribed position, and for generating the line synchronizing signal based on a detection result.

68. An image processing apparatus comprising:

receiving means for receiving a line synchronizing signal from an image recording unit which records images on a line-by-line basis; and controlling means for controlling motion of an optical device relative to an original in accordance with the line synchronizing signal received by the receiving means, the optical device being used to read an image of the original;

wherein the controlling means prevents, for each frame reading operation, variations in positions of lines which are read in synchronism with the line synchronizing signal by controlling the motion of the optical device relative to the original in accordance with the line synchronizing signal received by the receiving means.

69. The apparatus according to claim 68, further comprising memory means for storing image data read by the optical device.

70. The apparatus according to claim 69, wherein the apparatus has a first mode in which read image data is written into the memory means and the read image data is supplied to the image recording unit, wherein writing the image data to the memory means and supplying the image data to the image recording unit are performed in parallel, and a second mode in which the image data stored in the memory means is read out and supplied to the image recording unit.

71. The apparatus according to claim 68, wherein a frame reading operation is performed a plurality of times in order to generate image data for a plurality of color components.

72. The apparatus according to claim 68, further comprising the image recording unit.

73. An image processing method comprising the steps of:

receiving a line synchronizing signal from an image recording unit which records images on a line-by-line basis; and controlling motion of an optical device relative to an original in accordance with the line synchronizing signal received by the receiving means, the optical device being used to read an image of the original;

wherein the controlling step prevents, for each frame reading operation, variations in positions of lines which are read in synchronism with the line synchronizing signal by controlling the motion of the optical device relative to the original in accordance with the line synchronizing signal received in the receiving step.

74. The method according to claim 73, further comprising a storing step for storing image data read by the optical device in a memory means.

75. The method according to claim 74, wherein the method has a first mode in which read image data is written into the memory means and the read image data is supplied to the image recording unit, wherein writing the image data to the memory means and supplying the image data to the recording unit are performed in parallel, and a second mode in which the image data stored in the memory means is read out and supplied to the image recording unit.

76. The method according to claim 73, wherein a frame reading operation is performed a plurality of times in order to generate image data for a plurality of color components.

77. The method according to claim 73, further comprising a step of recording the images using the image recording unit.

* * * * *

UNITED STATES PATENT AND TRADEMARK OFFICE
CERTIFICATE OF CORRECTION

PATENT NO. : 5,673,115
DATED : September 30, 1997
INVENTOR(S) : Shinobu Arimoto

It is certified that error appears in the above-identified patent and that said Letters Patent is hereby corrected as shown below:

COLUMN 9

Line 20, "less" should read --less than--.

COLUMN 18

Line 26, "ITOPA, ITOPA" should read --ITOPA, ITOPB--.

COLUMN 22

Line 4, "starts-reading" should read --starts reading--.

Signed and Sealed this

Twenty-sixth Day of May, 1998

Attest:

BRUCE LEHMAN

Attesting Officer   Commissioner of Patents and Trademarks